US008386074B2

(12) United States Patent
Smith, III et al.

(10) Patent No.: US 8,386,074 B2
(45) Date of Patent: Feb. 26, 2013

(54) VENDING MACHINE

(75) Inventors: George W. Smith, III, Barrington, IL (US); Mark W. Sprenger, Elk Grove Village, IL (US)

(73) Assignee: Interactive Vending Corporation, Barrington, IL (US)

( * ) Notice: Subject to any disclaimer, the term of this patent is extended or adjusted under 35 U.S.C. 154(b) by 224 days.

(21) Appl. No.: 12/787,040

(22) Filed: May 25, 2010

(65) Prior Publication Data

US 2011/0295417 A1 Dec. 1, 2011

(51) Int. Cl.
*G06F 17/00* (2006.01)

(52) U.S. Cl. .......................... 700/236; 221/96; 700/232

(58) Field of Classification Search .................... 221/96; 700/236

See application file for complete search history.

(56) References Cited

U.S. PATENT DOCUMENTS

| | | | |
|---|---|---|---|
| 2,136,089 | A | 11/1938 | Stone |
| 2,954,128 | A | 9/1960 | Gordon |
| 3,251,390 | A | 5/1966 | Evans |
| 3,294,281 | A | 12/1966 | Schlaf |
| 3,601,281 | A | 8/1971 | Schlaf |
| 3,653,540 | A | 4/1972 | Offutt |
| 3,690,510 | A | 9/1972 | Deaton |
| 3,720,350 | A | 3/1973 | Patrick |
| 3,731,841 | A | 5/1973 | Schlaf |
| 3,737,071 | A | 6/1973 | Offutt et al. |
| 3,773,217 | A | 11/1973 | Schlaf |
| 3,828,971 | A | 8/1974 | Offutt et al. |

(Continued)

FOREIGN PATENT DOCUMENTS

| | | |
|---|---|---|
| EP | 2192807 | 6/2010 |
| WO | WO0101359 A1 | 1/2001 |

(Continued)

OTHER PUBLICATIONS

Automated Retail Concepts unveils 'The Shopping Wall', a fully automated airport store, Article, published by TheMoodieReport.com, [online] [retrieved from the Internet Sep. 7, 2010] <URL:http://www.moddiereport.com/document.php?c_id=1178&doc_id=19348>. (4 pages).

(Continued)

*Primary Examiner* — Timothy Waggoner

(74) *Attorney, Agent, or Firm* — Neal, Gerber & Eisenberg LLP

(57) ABSTRACT

One embodiment of the vending machine of the present disclosure provides a housing defining a product holding area, a frame positioned in the product holding area, a plurality first product holders removably attached to the frame and configured to hold a first type of product package, a plurality different second product holders configured to hold a second different product package, a plurality of RFID sensors, each RFID sensor attached to a different one of the product holders, a door attached to the housing, a first electronic combination display device and input device attached to the door, a second electronic display device attached to the door and configured in one mode to display advertising or other content, a physical product display area in the door, a signage display area in the door, a payment receiver in the door, a product retrieval area in the door, a lock configured to lock the door to the housing, and a computer control system including at least one processor configured to control various functions of the vending machine.

14 Claims, 27 Drawing Sheets

U.S. PATENT DOCUMENTS

| | | | | |
|---|---|---|---|---|
| 3,840,147 | A | 10/1974 | O'Neal et al. | |
| 3,986,637 | A | 10/1976 | Wittem et al. | |
| 4,227,614 | A | 10/1980 | Hollander, Jr. | |
| D257,585 | S | 12/1980 | Neuwirth | |
| 4,258,860 | A | 3/1981 | Boettcher | |
| 4,312,460 | A | 1/1982 | Boettcher | |
| 4,363,422 | A | 12/1982 | Boettcher | |
| D268,331 | S | 3/1983 | Kay et al. | |
| 4,436,194 | A | 3/1984 | Hanley | |
| 4,496,052 | A | 1/1985 | Nertman | |
| 4,510,770 | A * | 4/1985 | Vella | 221/281 |
| 4,570,818 | A | 2/1986 | Borst et al. | |
| 4,638,922 | A | 1/1987 | Stoltz | |
| 4,694,960 | A | 9/1987 | Phipps et al. | |
| 4,757,915 | A | 7/1988 | Albright et al. | |
| 4,762,250 | A | 8/1988 | Friberg | |
| 4,771,934 | A | 9/1988 | Kalmanides | |
| 4,823,984 | A * | 4/1989 | Ficken | 221/96 |
| D305,408 | S | 1/1990 | LaJoie | |
| 4,896,024 | A | 1/1990 | Morello et al. | |
| 4,903,815 | A | 2/1990 | Hirschfeld et al. | |
| D306,561 | S | 3/1990 | Lee | |
| 4,927,055 | A * | 5/1990 | Groover | 221/67 |
| 4,942,980 | A | 7/1990 | Hellermann et al. | |
| 4,986,441 | A | 1/1991 | Kanbe et al. | |
| 4,997,125 | A | 3/1991 | Glerum | |
| 5,070,986 | A | 12/1991 | Hoffman et al. | |
| 5,091,713 | A | 2/1992 | Horne et al. | |
| D329,600 | S | 9/1992 | LaJoie | |
| 5,186,355 | A | 2/1993 | VonDelinde et al. | |
| 5,288,010 | A | 2/1994 | Kleemola et al. | |
| 5,291,995 | A | 3/1994 | von Agris et al. | |
| 5,307,941 | A | 5/1994 | Siegal | |
| 5,390,711 | A * | 2/1995 | Murphey | 700/237 |
| 5,440,108 | A | 8/1995 | Tran et al. | |
| 5,564,546 | A | 10/1996 | Molbak et al. | |
| 5,620,079 | A | 4/1997 | Molbak et al. | |
| D393,799 | S | 4/1998 | Pope et al. | |
| 5,831,862 | A * | 11/1998 | Hetrick et al. | 700/236 |
| D401,765 | S | 12/1998 | Soutullo | |
| 5,941,363 | A | 8/1999 | Partyka et al. | |
| 5,996,838 | A * | 12/1999 | Bayer et al. | 221/75 |
| 6,003,733 | A | 12/1999 | Wheeler | |
| D434,315 | S | 11/2000 | Clarke | |
| 6,158,598 | A | 12/2000 | Josefsson | |
| 6,182,857 | B1 | 2/2001 | Hamm et al. | |
| 6,216,173 | B1 | 4/2001 | Jones et al. | |
| D445,330 | S | 7/2001 | Clarke, III | |
| D447,182 | S | 8/2001 | Marshall et al. | |
| D447,248 | S | 8/2001 | Marshall et al. | |
| D447,571 | S | 9/2001 | Marshall et al. | |
| D452,329 | S | 12/2001 | Marshall et al. | |
| D454,401 | S | 3/2002 | Marshall et al. | |
| D454,961 | S | 3/2002 | Marshall et al. | |
| 6,367,653 | B1 * | 4/2002 | Ruskin et al. | 221/1 |
| 6,390,322 | B1 * | 5/2002 | Shin | 220/268 |
| D465,854 | S | 11/2002 | Marshall et al. | |
| D470,599 | S | 2/2003 | Marshall et al. | |
| 6,529,801 | B1 | 3/2003 | Rosenblum | |
| 6,604,652 | B1 | 8/2003 | Trautwein | |
| 6,698,228 | B2 | 3/2004 | Kateman et al. | |
| 6,830,149 | B2 | 12/2004 | Merboth et al. | |
| 6,883,681 | B1 | 4/2005 | Coughlin et al. | |
| 6,892,941 | B2 | 5/2005 | Rosenblum | |
| 6,899,626 | B1 * | 5/2005 | Luciano et al. | 221/154 |
| 6,907,741 | B2 | 6/2005 | Kateman | |
| 6,941,858 | B2 | 9/2005 | Kateman | |
| 6,952,928 | B2 | 10/2005 | Kateman | |
| 6,957,125 | B1 | 10/2005 | Rifkin | |
| 6,962,267 | B2 | 11/2005 | Herzog et al. | |
| 6,971,543 | B2 | 12/2005 | Halliburton et al. | |
| 7,014,108 | B2 | 3/2006 | Sorenson et al. | |
| 7,052,728 | B2 | 5/2006 | Kateman et al. | |
| 7,066,348 | B2 | 6/2006 | Skavnak | |
| 7,083,036 | B2 | 8/2006 | Adams | |
| 7,131,279 | B2 | 11/2006 | Kateman et al. | |
| 7,213,697 | B2 | 5/2007 | Martin et al. | |
| 7,234,609 | B2 | 6/2007 | Delazzer et al. | |
| D546,476 | S | 7/2007 | Tressoff et al. | |
| D558,043 | S | 12/2007 | Kiser | |
| 7,366,586 | B2 | 4/2008 | Kaplan et al. | |
| 7,444,203 | B2 | 10/2008 | Rosenblum | |
| 7,447,605 | B2 | 11/2008 | Kuehnrich | |
| 7,448,516 | B2 | 11/2008 | Davis et al. | |
| 7,469,820 | B2 | 12/2008 | Rosenblum | |
| 7,471,993 | B2 | 12/2008 | Rosenblum | |
| D584,606 | S | 1/2009 | Wintmolders et al. | |
| 7,499,768 | B2 | 3/2009 | Hoersten et al. | |
| D593,157 | S | 5/2009 | Segal et al. | |
| D596,935 | S | 7/2009 | Golota et al. | |
| 7,559,437 | B2 | 7/2009 | Colelli et al. | |
| D601,013 | S | 9/2009 | Petitjean | |
| 7,584,869 | B2 | 9/2009 | Delazzer et al. | |
| 7,604,145 | B2 | 10/2009 | Percy | |
| 7,637,507 | B2 | 12/2009 | Peck et al. | |
| 7,640,596 | B1 | 12/2009 | Cho et al. | |
| 7,640,755 | B1 | 1/2010 | Kateman | |
| 7,653,599 | B2 | 1/2010 | Doran et al. | |
| 7,658,329 | B2 | 2/2010 | Gelbman | |
| 7,726,136 | B2 | 6/2010 | Baxter et al. | |
| 7,747,346 | B2 | 6/2010 | Lowe et al. | |
| 7,774,097 | B2 | 8/2010 | Rosenblum | |
| 7,787,986 | B2 | 8/2010 | Pinney et al. | |
| 7,787,987 | B2 | 8/2010 | Kuehnrich et al. | |
| 7,837,058 | B2 | 11/2010 | Collins et al. | |
| 7,909,206 | B2 | 3/2011 | Davis, Jr. | |
| 8,113,382 | B1 * | 2/2012 | Piersant et al. | 221/102 |
| 2004/0140317 | A1 | 7/2004 | Forte | |
| 2004/0195257 | A1 | 10/2004 | Halliburton et al. | |
| 2005/0205504 | A1 | 9/2005 | Takeda | |
| 2005/0216120 | A1 | 9/2005 | Rosenberg et al. | |
| 2006/0149415 | A1 | 7/2006 | Richards | |
| 2006/0162347 | A1 | 7/2006 | Kateman et al. | |
| 2006/0162348 | A1 | 7/2006 | Kateman et al. | |
| 2007/0114725 | A1 | 5/2007 | Peck et al. | |
| 2007/0143828 | A1 | 6/2007 | Jeal et al. | |
| 2007/0187488 | A1 | 8/2007 | Martinez et al. | |
| 2007/0199951 | A1 | 8/2007 | Levasseur | |
| 2007/0293982 | A1 | 12/2007 | Rosenblum | |
| 2008/0122615 | A1 | 5/2008 | Shoenfeld | |
| 2009/0005904 | A1 | 1/2009 | Kuehnrich et al. | |
| 2009/0005905 | A1 | 1/2009 | Kuehnrich et al. | |
| 2009/0018792 | A1 | 1/2009 | Kuehnrich | |
| 2009/0018959 | A1 | 1/2009 | Doran et al. | |
| 2009/0048712 | A1 | 2/2009 | Rosenblum | |
| 2009/0089187 | A1 | 4/2009 | Hoersten et al. | |
| 2010/0028501 | A1 | 2/2010 | Baxter et al. | |
| 2010/0057871 | A1 | 3/2010 | Kaplan et al. | |
| 2010/0094457 | A1 | 4/2010 | Garson et al. | |
| 2010/0100236 | A1 | 4/2010 | Segal et al. | |
| 2010/0103131 | A1 | 4/2010 | Segal et al. | |
| 2010/0198726 | A1 | 8/2010 | Doran et al. | |

FOREIGN PATENT DOCUMENTS

| | | |
|---|---|---|
| WO | WO 01/26510 | 4/2001 |
| WO | WO0225552 A2 | 3/2002 |
| WO | WO 2004/036467 | 4/2004 |
| WO | WO 2004/036513 | 4/2004 |
| WO | WO 2004/036866 | 4/2004 |
| WO | WO 2005/043357 | 5/2005 |
| WO | WO 2006/076733 | 7/2006 |
| WO | WO 2006/112817 | 10/2006 |
| WO | WO 2006/116108 | 11/2006 |
| WO | WO 2006/116109 | 11/2006 |
| WO | WO 2006/116110 | 11/2006 |
| WO | WO 2006/116112 | 11/2006 |
| WO | WO 2006/116113 | 11/2006 |
| WO | WO 2006/116114 | 11/2006 |
| WO | WO 2006/116115 | 11/2006 |
| WO | WO 2006/116116 | 11/2006 |
| WO | WO2010048375 A1 | 4/2010 |

OTHER PUBLICATIONS

Coinstar Prepaid Centre, Brochure, published by Coinstar Ltd., [online] [retrieved from the Internet Sep. 7, 2010] <URL: http://www.coinstar.co.uk/uk/html/A1-3-2>. (1 page).

Pay as You Glow, Article, published by wmagazine.com, published Jan. 2009, [retrieved from the Internet Sep. 7, 2010] <URL: http://www.utiqueshop.com/w_magazine.pdf>. (1 page).

The Coinstar Centre, Brochure, published by Coinstar Ltd., [online] [retrieved from the Internet Sep. 7, 2010] <URL: http://www.coinstar.co.uk/uk/html/A1-3-1>. (1 page).

ZoomShops Flying High in Airports and Beyond, Article, published by specialtyretail.com, [online] [retrieved from the Internet Sep. 7, 2010] <URL:http://www.specialtyretail.com/2009/winter/retailer_profiles/zoomshops_entrepreneur_profile>. (9 pages).

Zoomsystems Best Buy ZoomShop, Brochure, published by Zoomsystems, [online] [retrieved from the Internet Sep. 7, 2010] <URL:http://www.zoomsystems.com/zoomshops/zs_bestbuy.html>. (2 pages).

Zoomsystems iPod ZoomShop, Brochure, published by Zoomsystems, [online] [retrieved from the Internet Sep. 7, 2010] <URL:http://www.zoomsystems.com/zoomshops/zs_ipod.html>. (2 pages).

Zoomsystems Macys E-Spot ZoomShop, Brochure, published by Zoomsystems, [online] [retrieved from the Internet Sep. 7, 2010] <URL:http://www.zoomsystems.com/zoomshops/zs_macys-espot.html>. (3 pages).

Zoomsystems Proactiv ZoomShop, Brochure, published by Zoomsystems, [online] [retrieved from the Internet Sep. 7, 2010] <URL:http://www.zoomsystems.com/zoomshops/zs_proactiv.html>. (2 pages).

Zoomsystems Sephora ZoomShop, Brochure, published by Zoomsystems, [online] [retrieved from the Internet Sep. 7, 2010] <URL:http://www.zoomsystems.com/zoomshops/zs_sephora.html>. (2 pages).

International Search Report and Written Opinion for International Application No. PCT/US2011/036398 dated Aug. 1, 2011.

* cited by examiner 20
22
52
56
34
28
24
63c
54
63a
61a
62
61b
60
61c
63b 270
200
202
218b
256
216
212
268
218a
252b
206
204
208
228
210
32
28

280
274
272
278
284
70
284

280
70
282

280
70
274
276

280
70
278
272
276
70
272
278
274
276

272
70
276
274

274
70
278
272

72
156
158
150

72
156
150
154

72
160

156
72
158

154
152
284
RFID
150
156
72

154
284
RFID
160
72
150

VENDING MACHINE

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Various different types of vending machines are well known. There is a continuing need to provide new and different vending machines which enable consumers to select and purchase different products.

SUMMARY

Various embodiments of the present disclosure provide a vending machine having a housing and a door attached to the housing and configured to enable a user or consumer to select different related products, view the interaction between the products, purchase the products, and receive dispensed purchased products from the vending machine.

In one embodiment, the housing of the vending machine defines a product holding or storage area. A frame is positioned in the product holding or storage area and a plurality of a first type of independent product holders or product dispensors (sometimes referred to herein as “first product holders”) are each removably attached to the first frame. Each of the first type of product holders of the vending machine has a product sensor such as RFID reader connected to that product holder. The first product holders are repositionable and removable to accommodate product of various shapes and sizes in the product holding or storage area. In one embodiment, the vending machine also includes a plurality of a second different type of product holders or product dispensors (sometimes referred to herein as “second product holders”) located near the top and along the back wall of the housing. Each of the second type of product holders includes a product sensor connected to that product holder. The second type of product holders enable different types of products, such as more sensitive or fragile products, to move behind the other products held by the first type of product holders, rather than being dropped down into a vending area. It should be appreciated that the vending machine of the present disclosure can include any suitable combination of the different types of product holders or dispensers. The number and relative positions of the product holders or dispensers are readily adjustable to accommodate products of various shapes, sizes and types.

In one embodiment, the door includes a support structure and: (a) a first electronic combination display device and input device (such as a touch screen) mounted to the support structure, (b) a second electronic display device mounted to the support structure and configured in one mode to display advertising or other content, (c) an illuminated physical product display area mounted to the support structure and configured to dispay certain sample products, (d) an illuminated signage display area mounted to the support structure, (e) a payment receiver mounted to the support structure, (f) a product retreival area defined by the support structure, and (g) a lock assembly that prevents unauthorized access to product holding area. In further embodiments, the vending machine also includes a receipt distributor attached to the supporting structure of the door, which is configured to provide receipts and other paper documents such as coupons, advertising materials, tickets, etc.

In one embodiment, the vending machine does not show or display the actual purchasable products to the user; rather, the first electronic combination display device and input device enables the user to select, customize and view what the final product(s) will look like in real time. After viewing the final product(s), the electronic combination display device and input device enables the user to purchase the product(s). In one embodiment, the vending machine enables a user to interact with a video animation to select and customize one or more of the products. In one such embodiment, the vending machine enables a user to try various combinations of a product and one or more related or accessory products before purchasing those products. The vending machine utilizes software-controlled sensing technology such as RFID technology to ensure that only products that are available for immediate vending or purchase are displayed by the display device and offered to or selectable by the user (i.e., the vending machine will not display what it cannot immediately vend). The vending machine also utilizes software-controlled sensor technology, such as RFID technology, to automatically update the offering of products (e.g., automatically add items which become available to what is being offered to the user via the display device).

The present disclosure also contemplates specifically configured product packaging for the products dispensed by the vending machine. This product packaging for the vending machine is configured to receive and hold a tag (e.g., an RFID tag) which can be sensed by the sensors of the product holders, such as the RFID sensors.

In one embodiment, each package for the first type of product holder is a clamshell package which includes an RFID tag holding pocket configured to hold an RFID tag. The RFID tag holding pocket may be located on the exterior of the package or in the interior of the package. This enables the vending machine to identify and verify each product ready to be dispensed as an authorized product. In certain embodiments, the package is balanced to hold the package and the RFID tag in desired position on the on the individual product holders so that the tags can be sensed by the sensors attached to the product holders.

In one embodiment, each package for the second type of product holder is a cylindrical package which includes an RFID tag holding pocket configured to hold an RFID tag. The RFID tag holding pocket may be located on the exterior of the package or in the interior of the package.

The vending machine also includes a computer control system including a processor, which controls various functions of the vending machine and the components of the vending machine as further described below. In various embodiments, the computer control system facilitates: (i) the vending machine receiving information or data from a remote central management server; (ii) the vending machine transfering information or data to the central management server; (iii) remote monitoring of certain current product inventory to provide real time product inventory tracking; (iv) remote monitoring of how many times the door is opened and closed; (v) remote monitoring of vending activity; (vi) full accounting (including the processing of credit card purchases, etc); (vii) remote adjustment of product prices; (viii) remote selection of advertising to be displayed; and (ix) various other functions.

It should be appreciated that vending machine may include suitable receivers and transmitters for receiving and transmitting information or data such as though an Ethernet connection and/or a Remote Data Port (RDP). It should also be appreciated that, in certain embodiments, the vending machine may include a USB flashport to receive information or data. It should thus be appreciated that the present disclosure contemplates a vending machine configured to receive information, data, and software at any suitable time through multiple different communication channels or mechanisms.

The above and various other features, components and functions of the vending machine of the present disclosure are discussed below in more detail.

Additional features and advantages are described herein, and will be apparent from the following Detailed Description and the figures.

DETAILED DESCRIPTION

Figure 13:
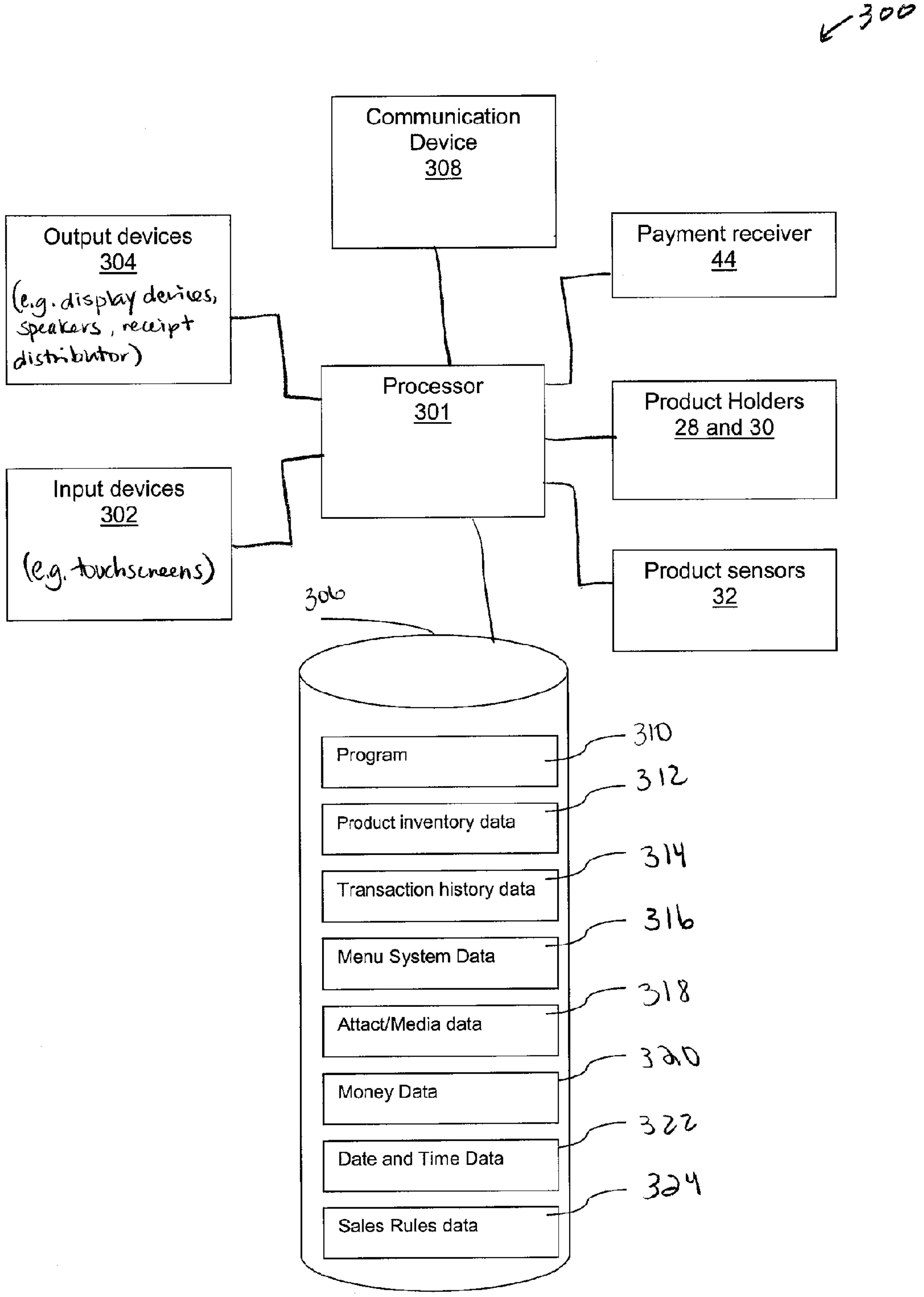
FIG. 13 is a schematic diagram of the electronic configuration of the vending machine in accordance with one embodiment of the present disclosure.

Referring now to the drawings and particularly FIGS. 1 to 8, one embodiment of the vending machine of the present disclosure is illustrated. Generally, the illustrated vending machine 20 includes a cabinet assembly or housing 22 defining a product holding area 24, a frame 26 positioned in the product holding area 24, a plurality of first product holders 28 attached to the frame 26, a plurality of second product holders 30 positioned behind the frame 26 and located near the top wall 52 and along a rear wall 58 of the housing 22, a plurality of product sensors 32 (e.g., RFID sensors) respectively attached to each of the product holders 28 and 30, a door 34 attached to the housing 22, a first electronic combination display device and input device 36 in the door 34, a second electronic display device 38 in the door 34, an illuminated physical product display area 40 in the door 34, an illuminated signage display area 42 in the door 34, a payment receiver 44 in the door 34, a product retrieval area 46 in the door 34, a receipt distributor 50 in the door 34, a lock assembly 48 configured to lock the door 34 to the housing 22, and a product delivery bin 62 located under the product holders of the vending machine 20. As generally illustrated in FIG. 13 and further discussed below, the vending machine 20 further includes a computer control system 300 (including a processor 301) configured to control and manage the operation and various components of the vending machine 20. The processor 301 is electrically coupled to a communication device 308 through which the processor 301 communicates, in accordance with certain embodiments, with other devices such as one or more peripheral devices, one or more servers, and/or one or more user devices, as discussed in detail below.

More specifically, the housing 22 is generally rectangular and stands upright. The housing 22 includes a top wall 52, a right side wall 54, a left side wall 56, a rear wall 58, and a bottom wall 60. These wall are made from a suitably strong material, such a stainless steel, and are suitably connected to each other. The top wall 52, right side wall 54, left side wall 56, rear wall 58 and bottom wall 60 of the housing define the product holding area 24 within the housing 22. It should be appreciated that the housing made be made of any suitable materials and that the shape, configuration, and size of the housing may vary in accordance with the present disclosure.

The door 34 is pivotally attached to the housing 22 by at least one hinge 64 disposed along one lengthwise edge of the door 34 and housing 22. The door 34 is selectively movable between an open position, which permits access to the product holding area 24, and a closed (and locked) position, which permits dispensing of product. As described above, the lock assembly 48 is configured to lock or secure the door 34 to the housing 22. The lock assembly 48 includes a first lock element (partially shown) attached to the door and a second lock element (not shown) attached to the housing 22. The first lock element is configured to engage the second lock element to hold the door in the closed or locked position. It should be appreciated that the locking assembly may include any suitable locking mechanism to ensure the door 34 maintains engagement with housing 22 when the vending machine is in use or in an operating mode.

Figure 1:
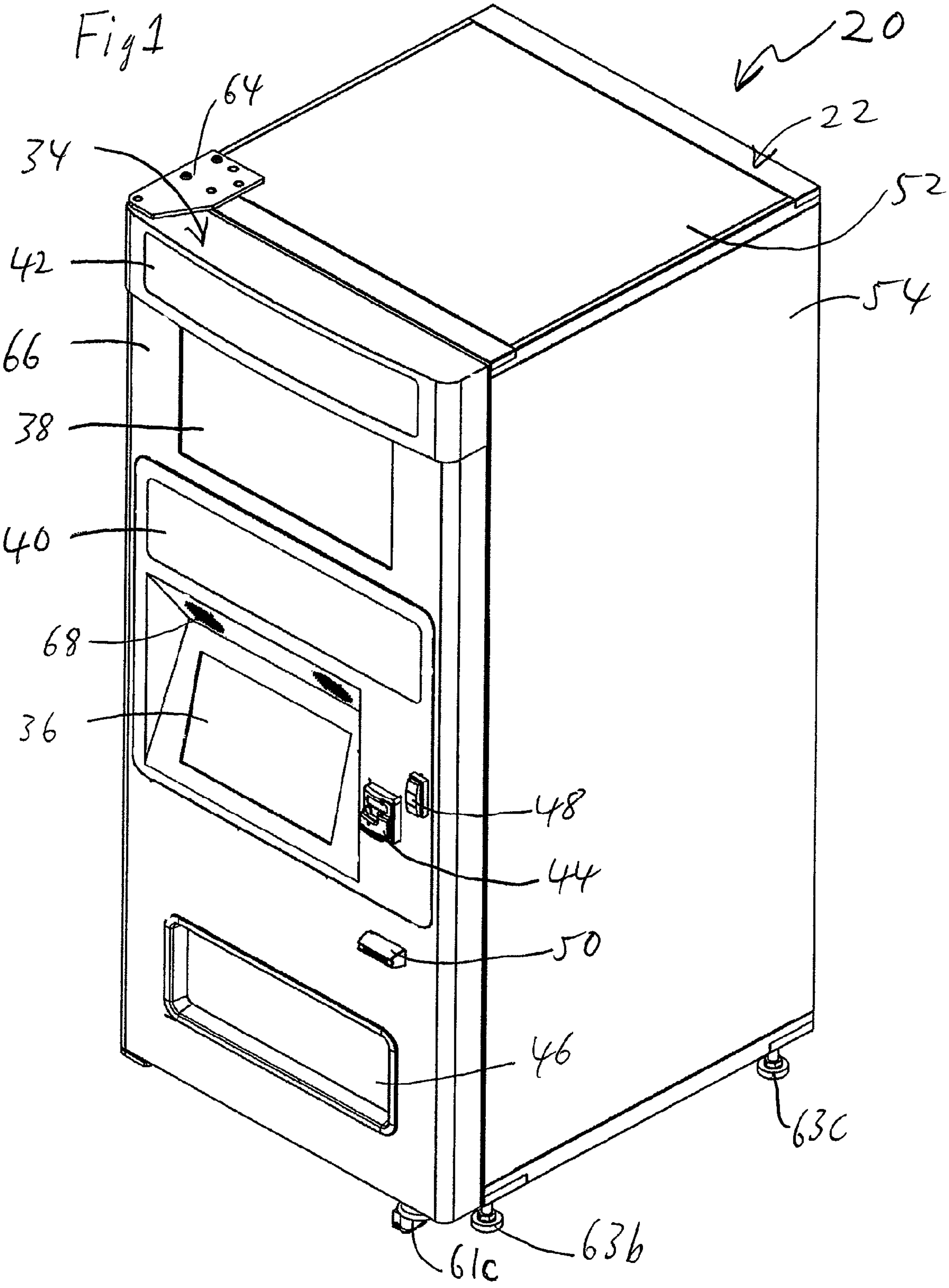
FIG. 1 is a front perspective view of one embodiment of the vending machine of the present disclosure, which is illustrated with the door of the vending machine in a closed position.
Figure 2:
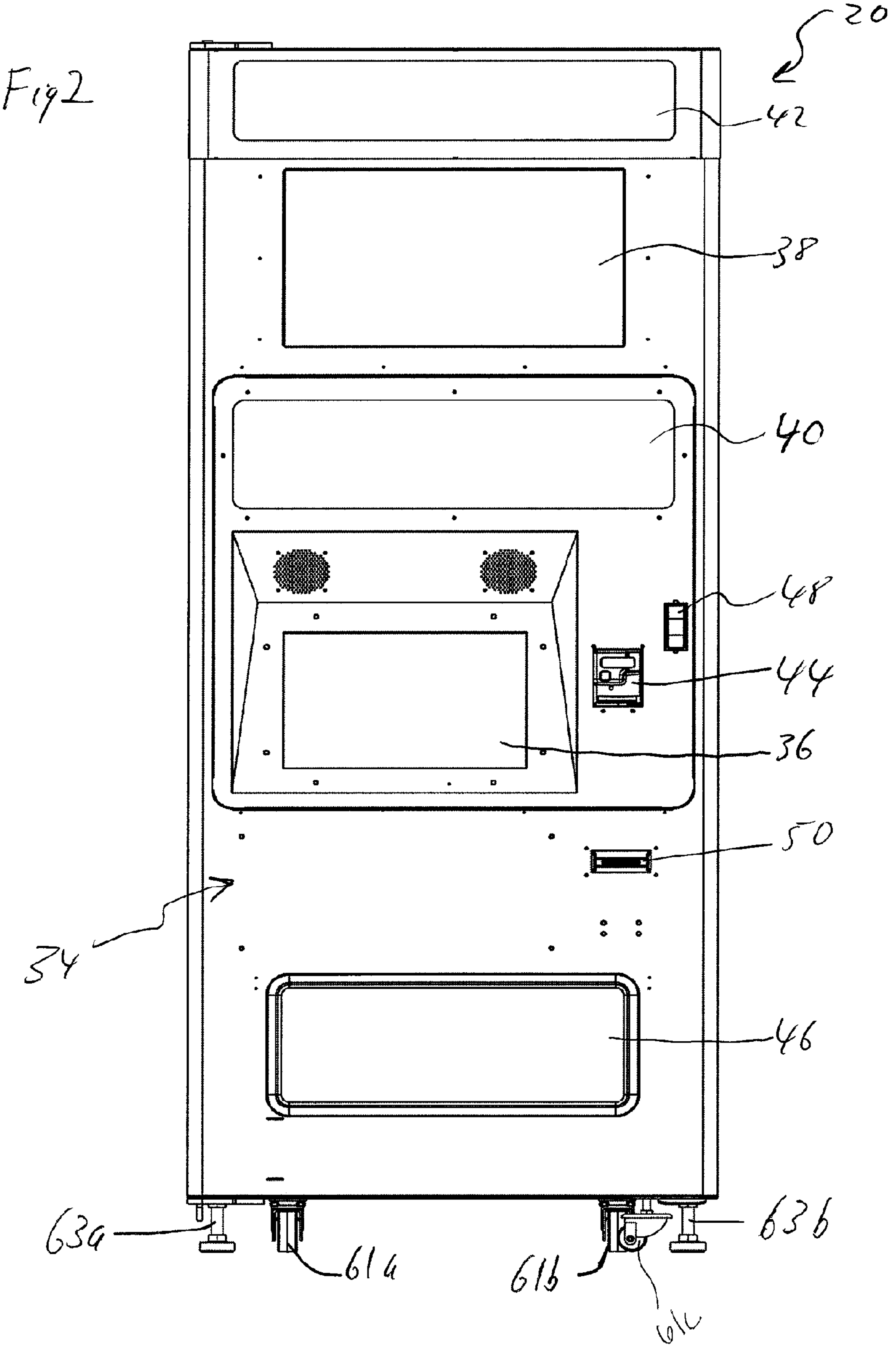
FIG. 2 is a front view of the vending machine of FIG. 1.
Figure 3:
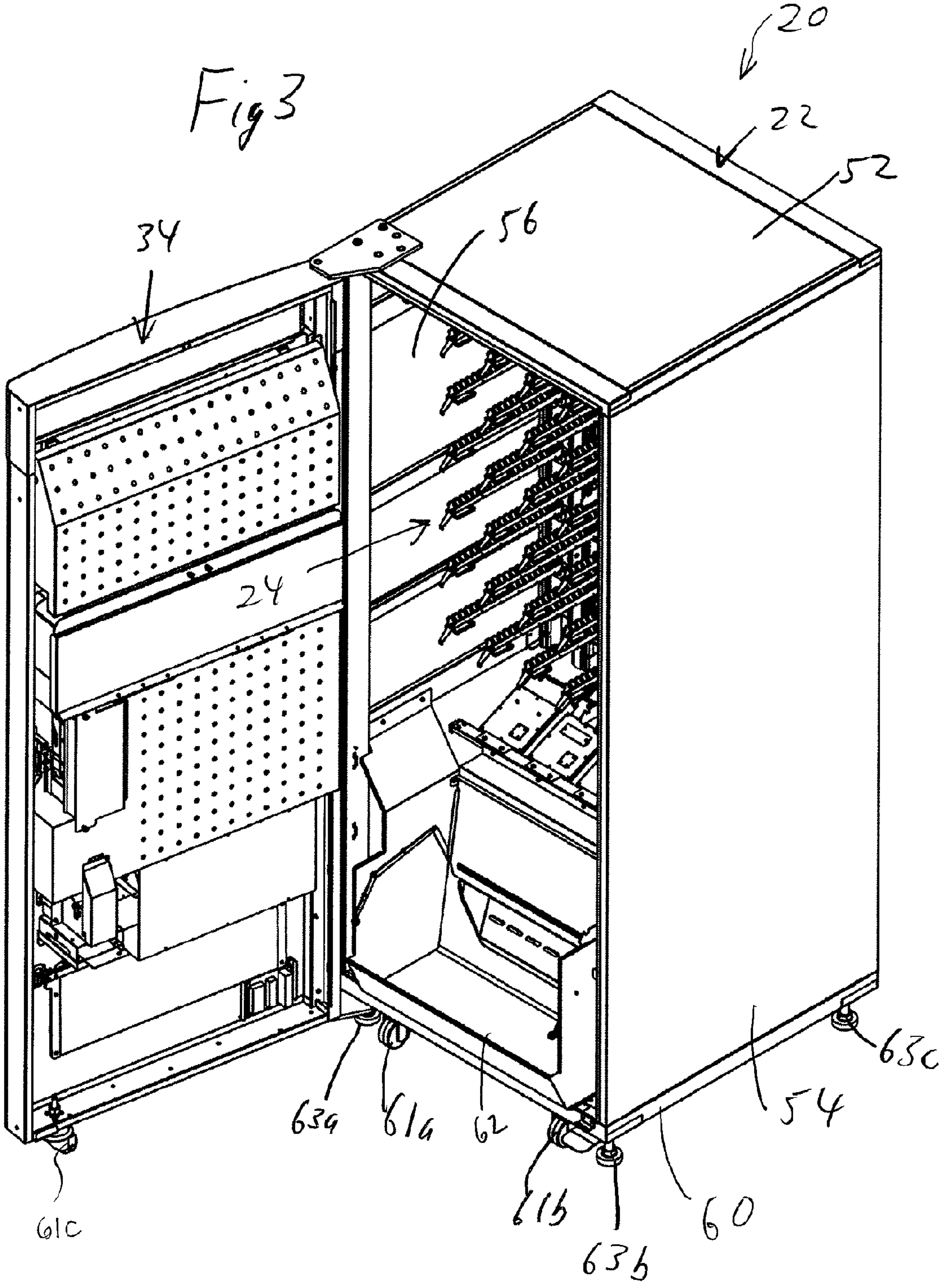
FIG. 3 is a front perspective view of the vending machine of FIG. 1, which is illustrated with the door of the vending machine in an open position, and with empty product holders (i.e., without products hanging on the product holders).
Figure 4:
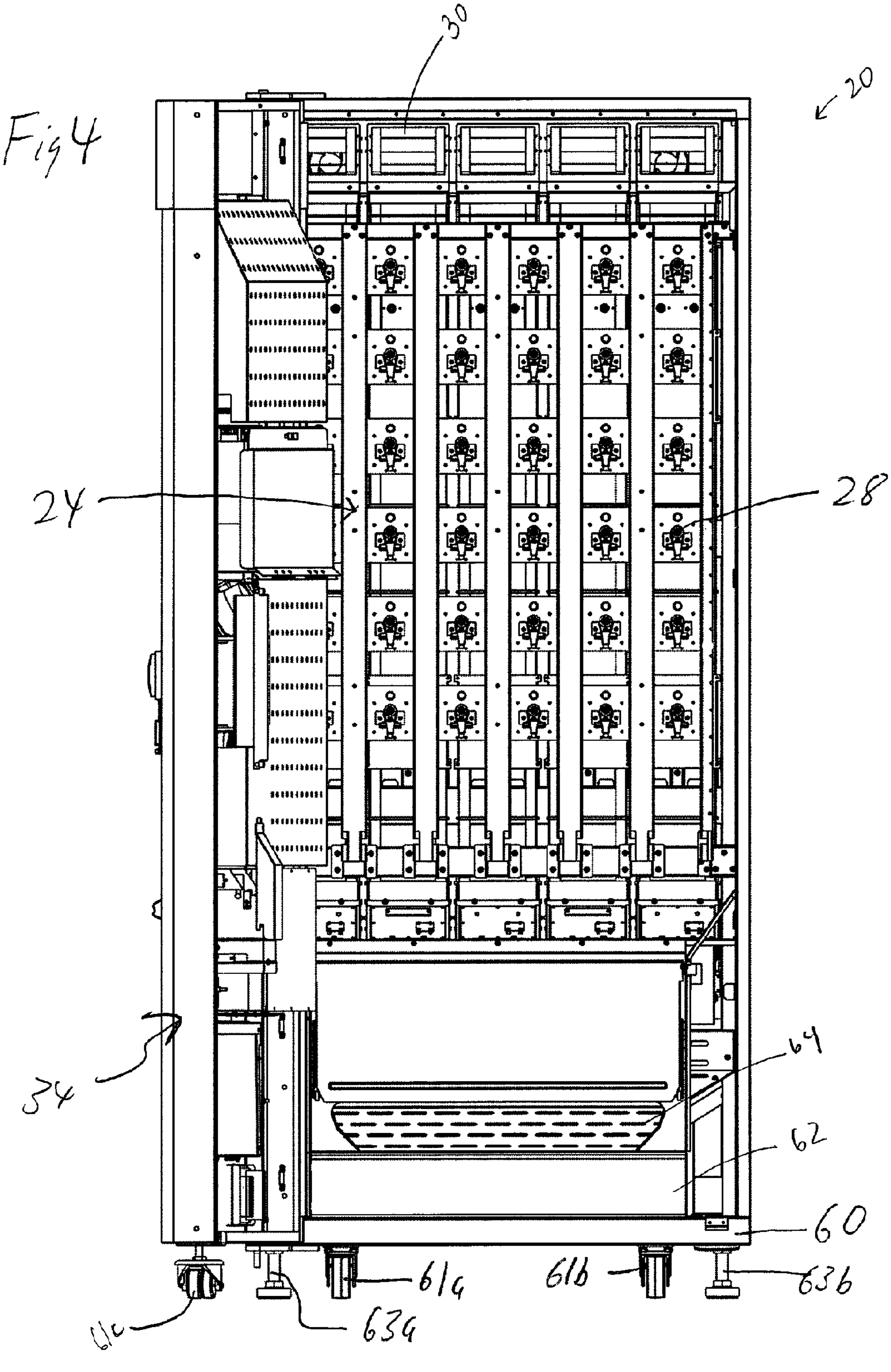
FIG. 4 is a front view of the vending machine of FIG. 1, which is illustrated with the door of the vending machine in an open position, and with empty product holders (i.e., without products hanging on the product holders).
Figure 5:
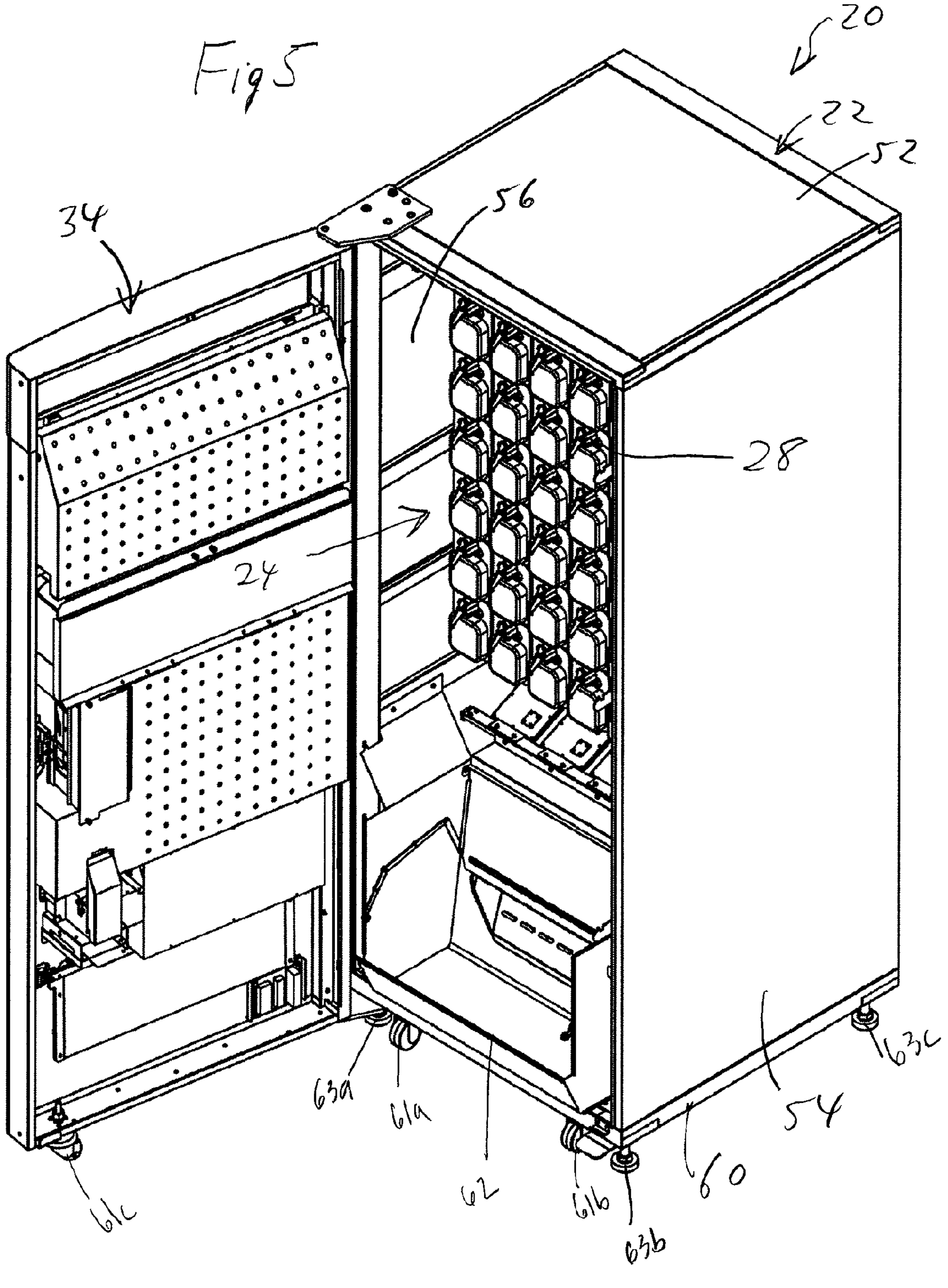
FIG. 5 is a front perspective view of the vending machine of FIG. 1, which is illustrated with the door of the vending machine in an open position, and with products on the product holders (i.e., with products hanging on the product holders).
Figure 6:
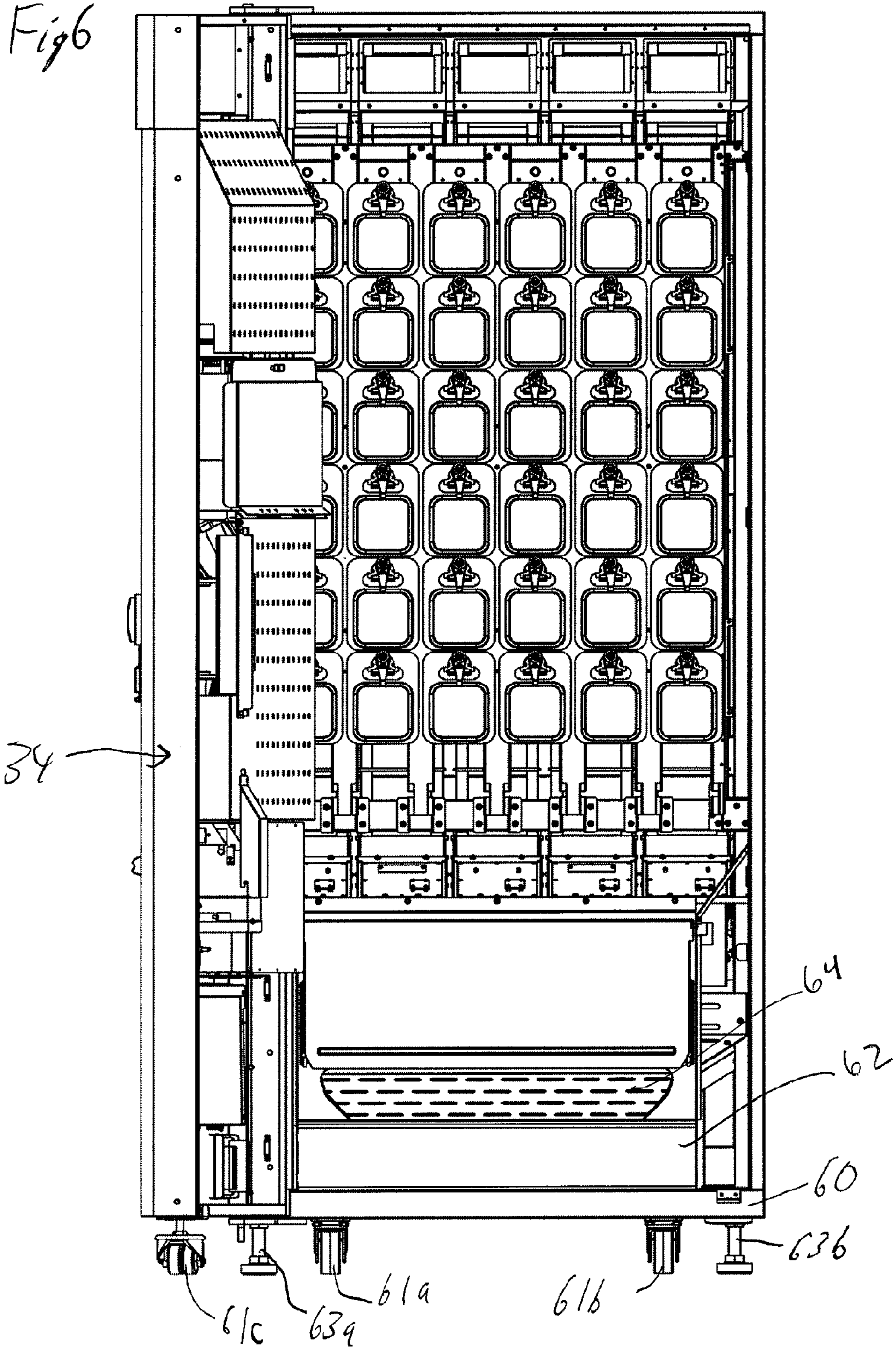
FIG. 6 is a front view of the vending machine of FIG. 1, which is illustrated with the door of the vending machine in an open position, and with products on the product holders (i.e., with products hanging on the product holders).

A plurality of conventional lockable casters such as casters 61*a*, 61*b*, and 61*c* and a plurality of supporting feet such as feet 63*a*, 63*b*, and 63*d* are suitably attached to the bottom wall of the housing 22 and the bottom of the door 34 to facilitate moving the vending machine 20 and to facilitate leveling and supporting the vending machine 20 when it is installed at a desired location. As best illustrated by FIG. 3, a plurality of the casters 61*a* and 61*b* are attached to the bottom wall of the housing 22, and one of the castors 61*c* is attached to the bottom of the door 34 to provide additional support to the vending machine 20 and to facilitate moving the door 34. It should be appreciated that the number and position of the casters and feet may vary in accordance with the present disclosure.

The frame 26 is suitably positioned and secured in the product holding area 24 of the vending machine 20. The frame 26 includes an adjustable racking mechanism 80 configured to removably hold or support a plurality of first product holders 28 in multiple different configurations to account for multiple different size and shape product holding packages. In the configuration illustrated in FIGS. 3 to 7, the first product holders 28 are arranged in a plurality of columns and rows. Each of the first product holders 28 is configured to hold a plurality of first product packages 70, as discussed below. In one embodiment, the frame is made of a suitably strong metal, such as steel. However, it should be appreciated that the frame may be made of any suitable material or combination of materials and that the shape, configuration, and size of the frame may vary in accordance with the present disclosure.

Figure 7:
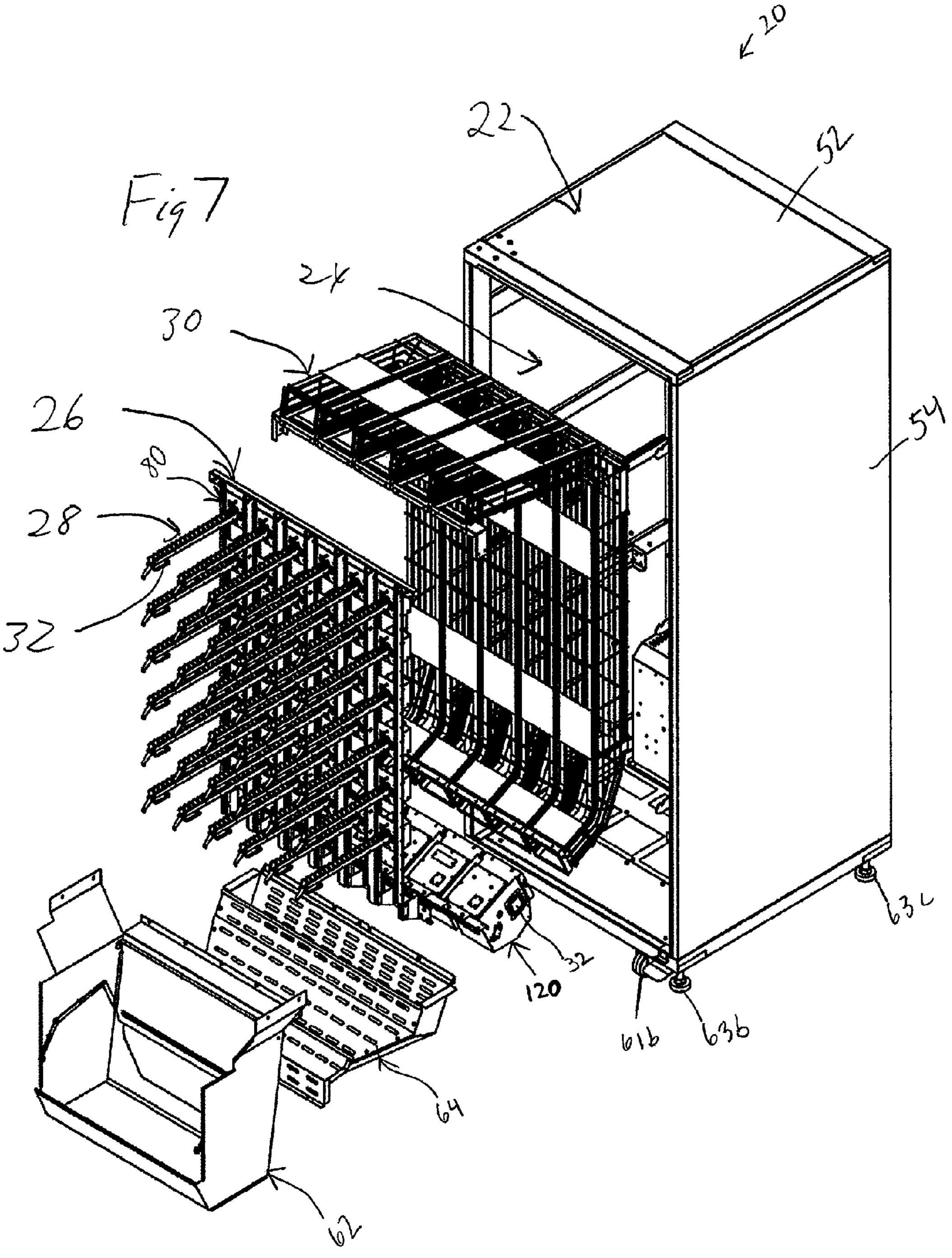
FIG. 7 is an exploded perspective view of certain components of the vending machine of FIG. 1, and specifically which illustrates the housing, the first frame, the first product holders supported by the first frame, the second product holders, and the product delivery bin.
Figure 8:
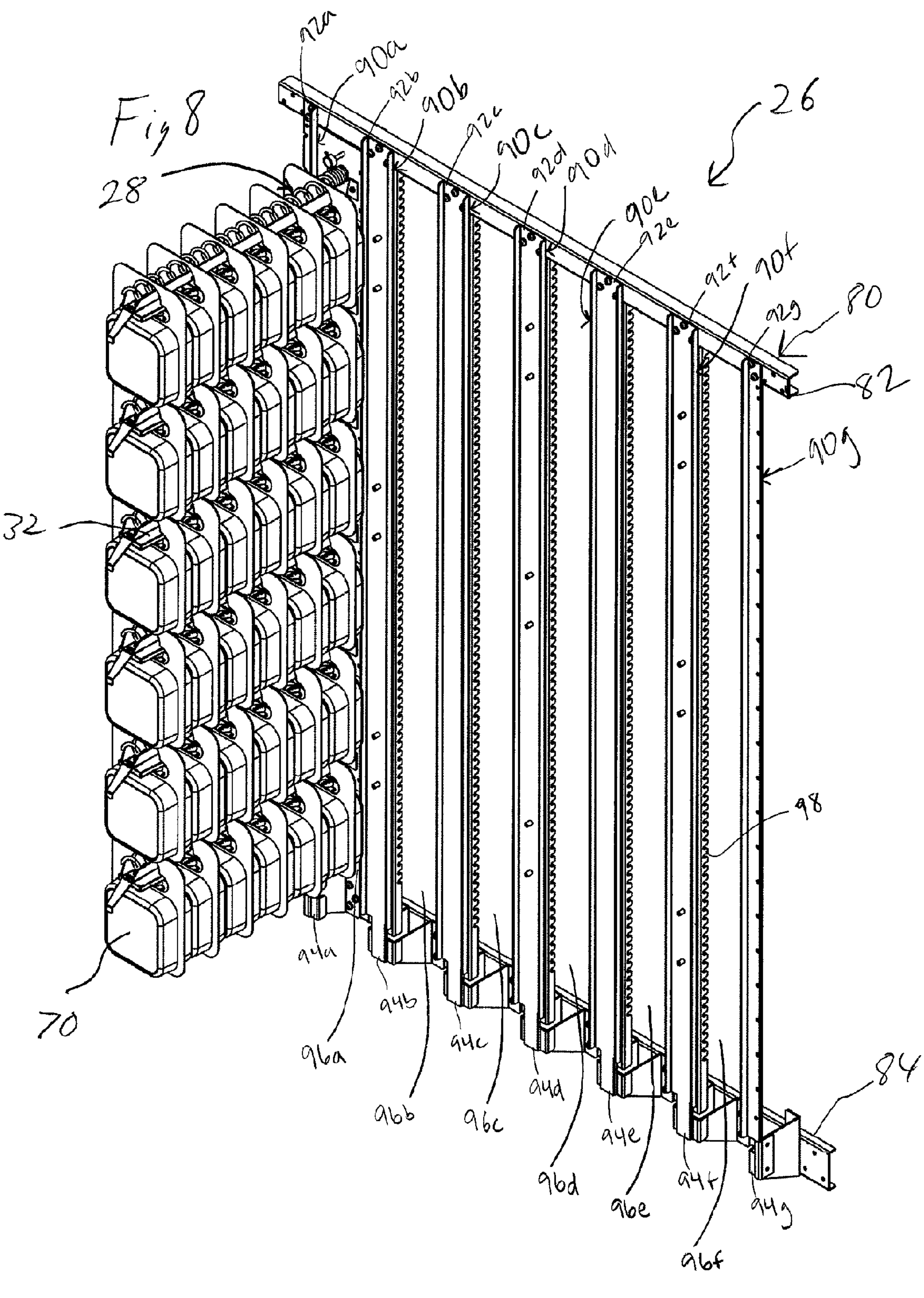
FIG. 8 is an enlarged front perspective view of part of the racking mechanism which supports the first product holders of the vending machine of FIG. 1, shown removed from the vending machine and shown with products hanging on one vertical column of product holders.

As best illustrated in FIGS. 7 and 8, the racking mechanism 80 includes a top horizontally extending bar or support 82, a bottom horizontally extending bar or support 84, and a plurality of vertically-extending, equally-spaced retaining tracks 90. More particularly, the racking mechanism 80 includes seven retaining tracks 90*a*, 90*b*, 90*c*, 90*d*, 90*e*, 90*f*, and 90*g*. Each of the retaining tracks 90*a*, 90*b*, 90*c*, 90*d*, 90*e*, 90*f* and 90*g* has a respective top end 92*a*, 92*b*, 92*c*, 92*d*, 92*e*, 92*f*, and 92*g* and a respective bottom end 94*a*, 94*b*, 94*c*, 94*d*, 94*e*, 94*f*, and 94*g*. The top end of each retaining track is attached to the top horizontally extending bar or support 82 of the racking mechanism 80. The bottom end of each retaining track is attached to the bottom horizontally extending bar or support 84 of the racking mechanism 80. Each pair of adjacent retaining tracks of the racking mechanism 80 defines a product holder slot or receipt area 96*a*, 96*b*, 96*c*, 96*d*, 96*e*, and 96*f*. More specifically, the seven retaining tracks 90*a*, 90*b*, 90*c*, 90*d*, 90*e*, 90*f*, and 90*g* of the racking mechanism 80 define six product holder slots or receipt areas 96*a*, 96*b*, 96*c*, 96*d*, 96*e*, and 96*f*. A plurality of first product holders 28 are configured to be received and securely held within each product holder slot or receipt area. Each of the retaining tracks 90*a*, 90*b*, 90*c*, 90*d*, 90*e*, 90*f*, and 90*g* includes an inner surface having a plurality of grooves or teeth 98 configured to engage the attachment bars 252*a*, 252*b* of the attachment assembly 212 of the first product holder 28 to secure the first product holder 28 in place within the product holder slot or receipt area 96*a*, 96*b*, 96*c*, 96*d*, 96*e*, and 96*f*, as discussed further below. For example, as illustrated in FIG. 7, six first product holders 28 are mounted in the product holder slot or receipt area 96*a* between the first retaining track 90*a* and the second retaining track 90*b*, which is adjacent to the first retaining track 90*a*. In the illustrated embodiment, this is the maximum number of first product holders 28 which may be mounted in any given product holder slot or receipt area. It should be appreciated from FIGS. 7 and 8, as well as FIGS. 3 to 6, that the illustrated vending machine 20 accommodates a total of thirty six first product holders 28.

The first product holders 28 are configured to be slidably and removably mounted in the product holder slot or receipt area 96*a*, 96*b*, 96*c*, 96*d*, 96*e*, and 96*f* defined by each pair of adjacent retaining tracks of the racking mechanism 80, as discussed in further detail below. One or more individual first product holders may be selectively repositioned up or down relative to the retaining tracks (such as by sliding the first product holders up or down) and/or removed entirely from the racking mechanism 80. In this manner, the present disclosure provides a repositionable and reconfigurable network of first product holders 28 for holding or storing product in the product holding area 24 of the vending machine 20. It should be appreciated that the number and positions of the first product holders 28 may be readily changed to accommodate first product packages 70 of various different shapes and sizes. It should also be appreciated that the number of retaining tracks and the distances or spacing between the retaining tracks may be alternatively configured to accommodate smaller or larger product packages. It should further be appreciated that the frame and first product holders can be configured to hold packages of different sizes and shapes.

FIGS. 9, 9A, 9B, 9C, 9D, 9E, 9F, 9G, 9H, and 9I illustrate one embodiment of a first product holder 28 of the present disclosure. It should be appreciated that the following description of the first product holder 28 shown in FIGS. 9, 9A, 9B, 9C, 9D, 9E, 9F, 9G, 9H, and 9I applies to each of the plurality of first product holders of the vending machine 20. This first product holder 28 includes a bracket 200, a drive unit 202 connected to the bracket 200, a cover plate 204 connected to the bracket 200, a vending spindle or helix 206 connected to the drive unit 202, a sensor holder 208 configured to hold a product sensor 32, a product guide bar 210, and an attachment assembly 212 for securing the first product holder to the frame 26 of the vending machine.

The bracket 200 includes a rear wall 216 and two side walls 218*a*, 218*b* connected to the rear wall 216. Each of the side walls 218*a*, 218*b* is connected to a respective mounting tab 220*a*, 220*b*. The mounting tabs 220*a*, 220*b* of the bracket 200 are secured to a rear surface 222 of the cover plate 204 with fasteners (not numbered). It should be appreciated that the bracket 200 and the cover plate 204 may be made of metal, plastic or any other suitable material or combination of materials.

The walls of the bracket 216, 218*a*, 218*b* and the rear surface 222 of the cover plate 204 define an area for housing the drive unit 202. The drive unit 202 is secured to the interior surface of the rear wall 216 of the bracket 200. More particularly, in the illustrated embodiment, the drive unit 202 is attached to the bracket 200 with a plurality of fasteners 224*a*, 224*b*, 224*c*, and 224*d* which pass through a plurality of holes (not shown) in the rear wall 216 of the bracket 200. In the illustrated embodiment, the drive unit 202 includes a sprocket 232, a motor 234, a plurality of control gears 236, and a helix/motor supporting bracket 238. It should be appreciated, however, that any suitable configuration for the drive unit 202 may be employed.

The cover plate 204 defines a first opening 226 for retaining the vending spindle or helix 206. The vending spindle or helix 206 includes a front end 228 and a rear end 230. The rear end 230 of the helix 206 passes through the first opening 226 of the cover plate 204 and is coupled to the drive unit 202.

The sensor holder 208 is positioned below the vending spindle or helix 206 and is configured to hold the product sensor 32. In the illustrated embodiment, the sensor holder 208 includes a base 240 having an upper surface and a bottom surface (not shown) and two side walls 242 and 244 connected to the base 240. The sensor holder 208 includes a rear end 246 which is connected to the cover plate 204, and a front end 448 which is connected to the product guide bar 210. The product guide bar 210 extends forwardly from the front end 248 of the sensor holder 208 and slopes downwardly to faciliate directing dispensed product into the product delivery bin 62 located under the product holders. The sensor holder 208 may be made from metal or any other suitable material or combination of materials. In certain embodiments, the sensor holder 208 may provide additional support for the vending spindle or helix 206.

The product sensor 32 is connected to the bottom surface of the base 240 of the sensor holder 208 at a location near the front end 248 of the sensor holder 208. It should be appreciated that the sensor holder 208 may be configured to accommodate one or more additional product sensors. In various alternative embodiments, one, a plurality, or each of the first product holders 28 may include a sensor holder 208 configured to hold multiple product sensors 32. The sensor in this embodiment is an RFID sensor; however, it should be appreciated that other suitable sensors may be employed in accordance with the present disclosure.

The product sensor 32 can be configured to monitor or sense a number of conditions or events, such as (i) when a first product package 70 is held at the end of the helix 200 and ready to be dispensed, (ii) when a first product package 70 held by the helix 200 is dispensed, (iii) when a first product package 70 held by the helix 200 is not an authorized product package; (iv) when there is no product package at the end of the helix 200 ready to be dispensed and a next available product package is located; (v) the exact quantity of first product packages 70 held by the helix 200, (vi) when the supply of first product packages of the helix 200 reaches one or more predetermined levels, (vii) when the quantity of first product packages 70 held by the helix 200 is completely exhausted, or (viii) any other suitable condition or event.

The vending spindle or helix 206 is configured to hold or store a plurality of first product packages 70 within its convolutions. When a purchaser or consumer buys a product from the vending machine 20, the drive unit 202 causes the helix 206 to rotate (e.g., through a predetermined number of rotational degrees, until a certain amount of time has elapsed, and/or until the product sensor 32 senses that a designated event has occurred). When the helix 206 rotates, the first product packages 70 held or stored by the helix 206 are carried or moved toward the front end 228 of the helix 206 until the first product package 70 located closest to the front end 228 of the helix 206 (e.g., a purchased one of the first product packages) is released from the front end 228 of the helix 206. After the purchased one of the first product packages is released from the front end 228 of the helix 206, the product guide bar 210 directs or guides the product package as it drops into the product delivery bin 62 of the vending machine 20. Once the purchased first product package 70 lands in the product delivery bin 62, the purchaser may reach through the product retreival area 46 of the door 34 to retrieve the purchased product from the product delivery basket or bin 62.

The product delivery bin 62 may include a suitable supporting frame or cage 64. The product delivery bin 62 may be made of metal, plastic, and/or any other suitable material or combination of material.

As the purchased first product package 70 is being dispensed (i.e., as the helix 206 rotates to carry the purchased first product package to the front end 228 of the helix 206 for dispensing), the rotation of the helix 206 also causes any other first product packages 70 in line to move forward toward the front end of the helix 206. In one embodiment, after dispensing a purchased first product package 70, the helix 206 may continue to rotate until a next first product package is detected by the product sensor 32 of the first product holder 28. When there is no product package to be sensed (e.g., there is a space between product packages on the first product holder), the helix 206 continues to rotate until the product sensor 32 senses the next available first product package 70 held by the helix 206. After a desiganted number of rotations when not product is sensed, the processor of the vending machine will know that no products are left on that product holder.

Figure 9:
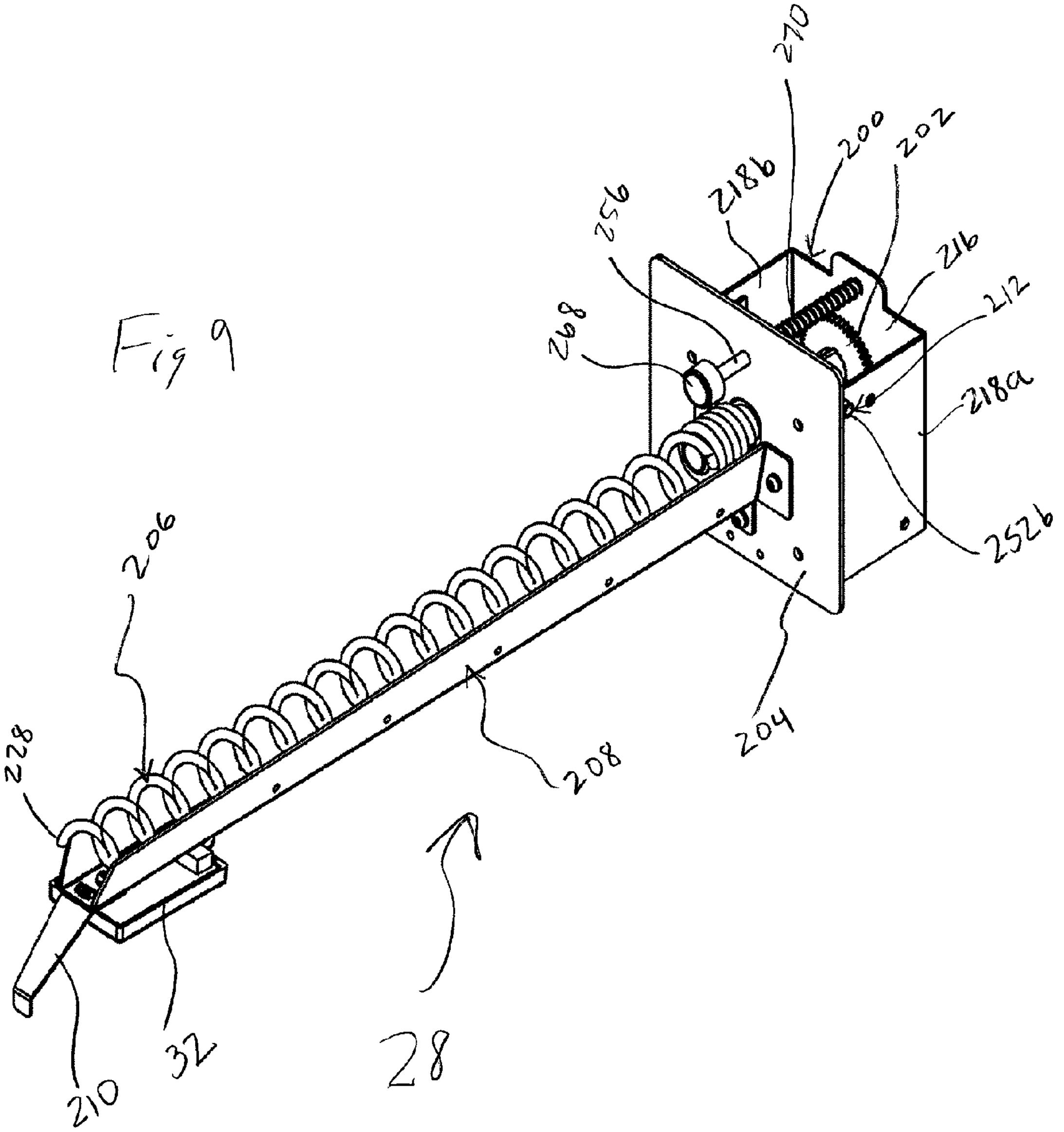
FIG. 9 is a perspective view of one of the first product holders of the vending machine of FIG. 1, which illustrates a product sensor connected to the product holder, and which is shown empty (i.e., without products hanging on the product holder).
Figure 9A:
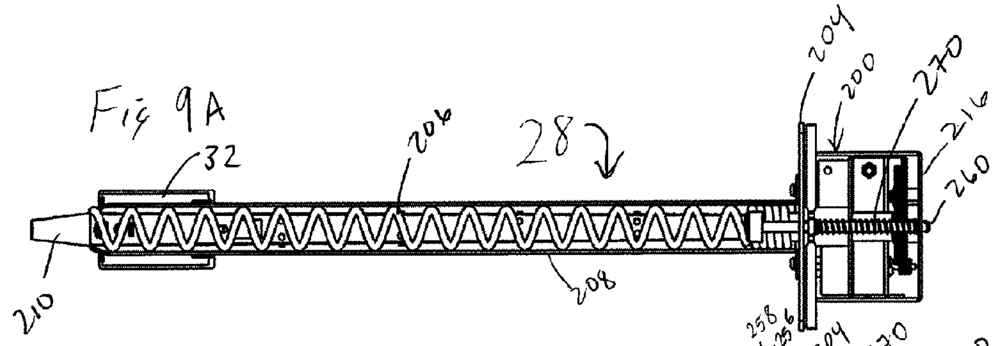
FIG. 9A is a top view of the first product holder of FIG. 9.
Figure 9B:
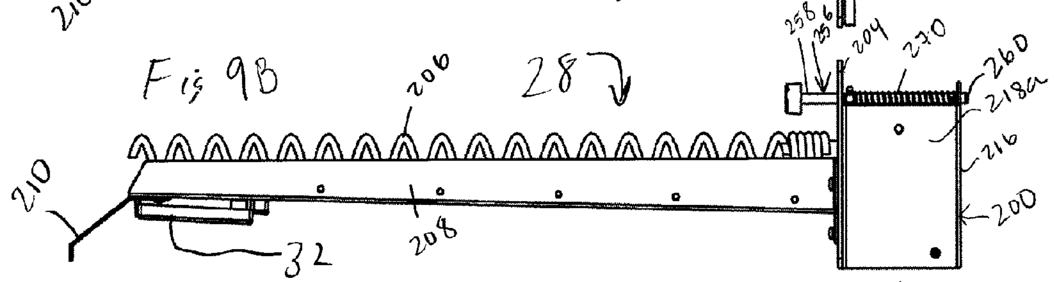
FIG. 9B is a side view of the first product holder of FIG. 9.
Figure 9C:
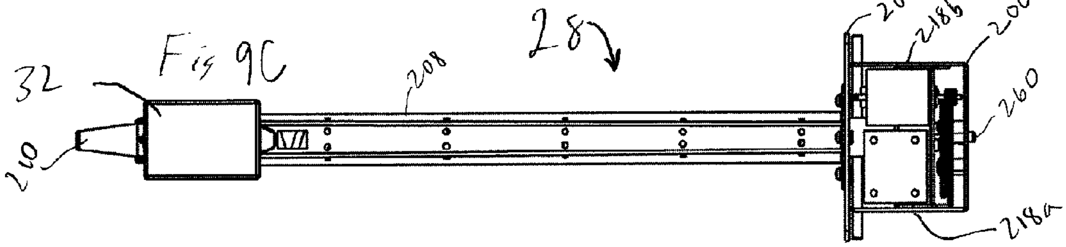
FIG. 9C is a bottom view of the first product holder of FIG. 9.
Figure 9D:
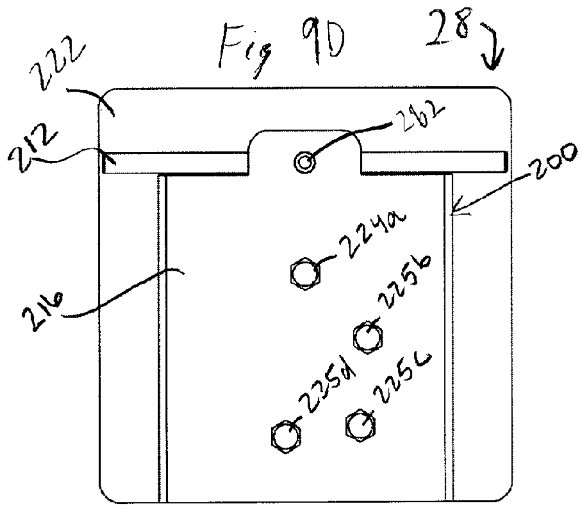
FIG. 9D is a rear view of the first product holder of FIG. 9.
Figure 9E:
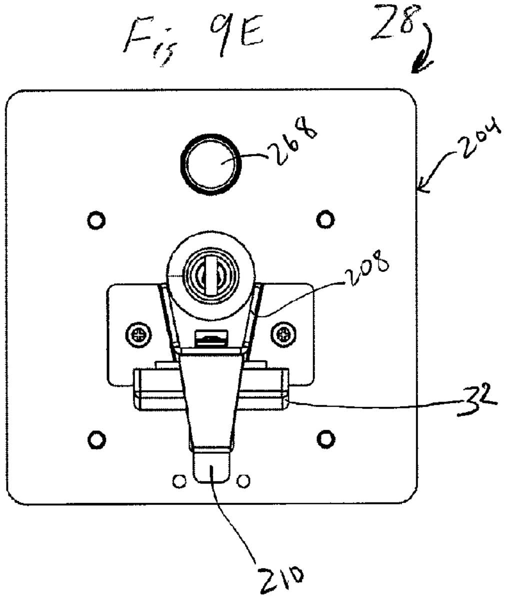
FIG. 9E is a front view of the first product holder of FIG. 9.
Figure 9F:
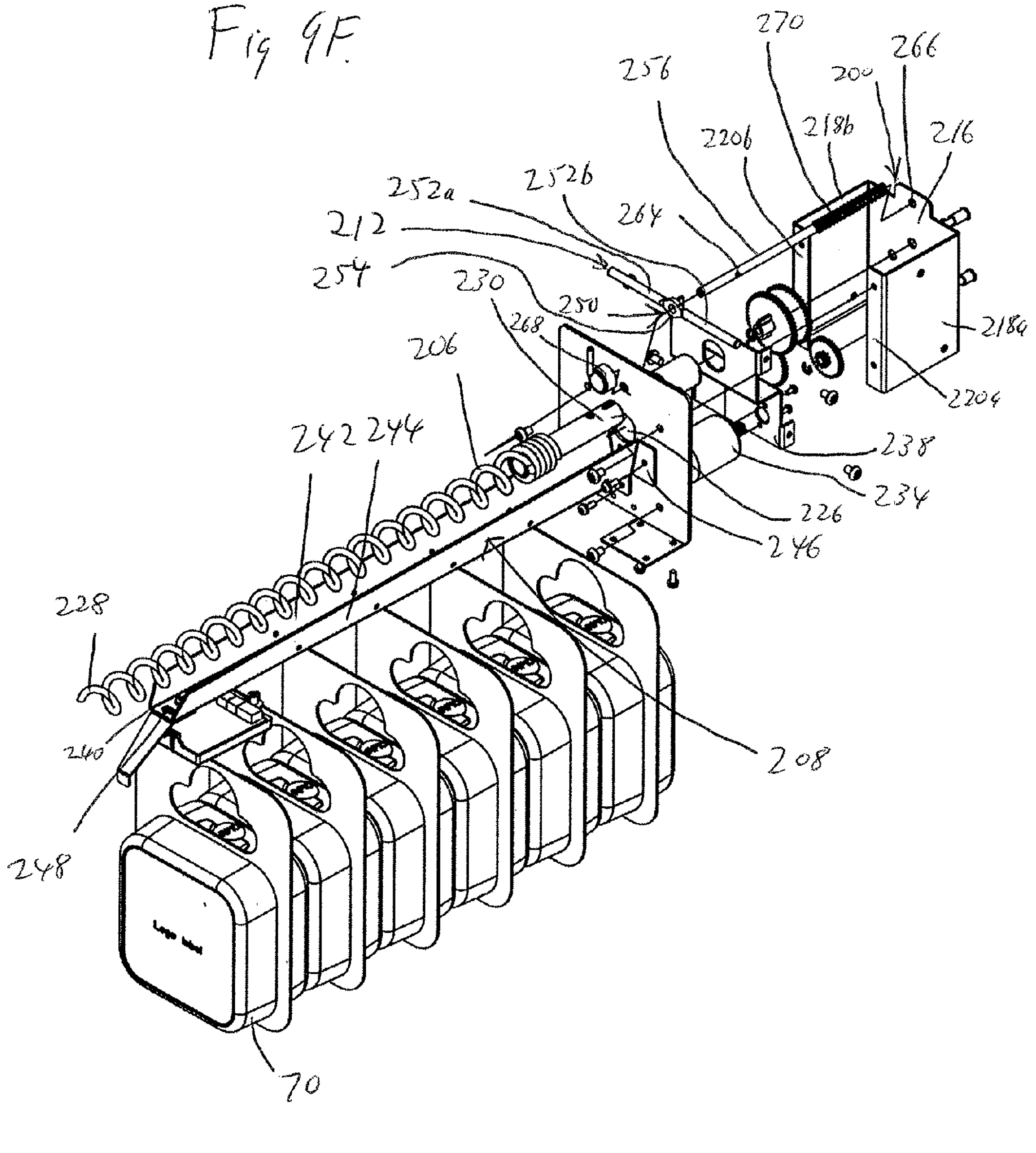
FIG. 9F is a partially exploded perspective view of the first product holder of FIG. 9, which is shown empty (i.e., without products hanging on the product holder) and which shows the products to be loaded onto the product holder below the product holder.
Figure 9H:
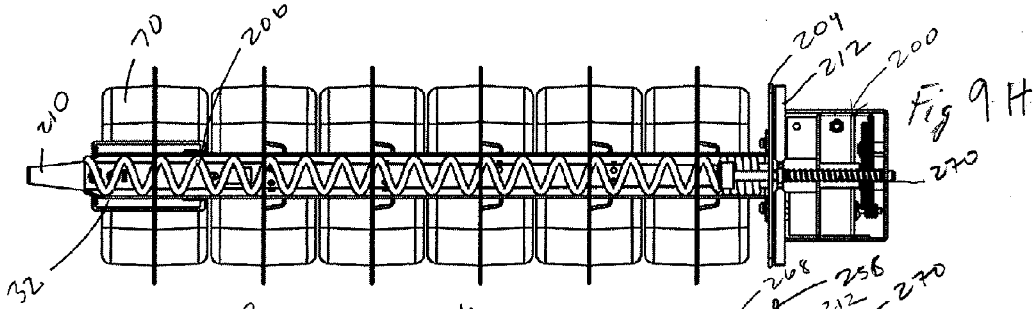
FIG. 9H is a top view of the first product holder of FIG. 9 shown full.
Figure 9I:
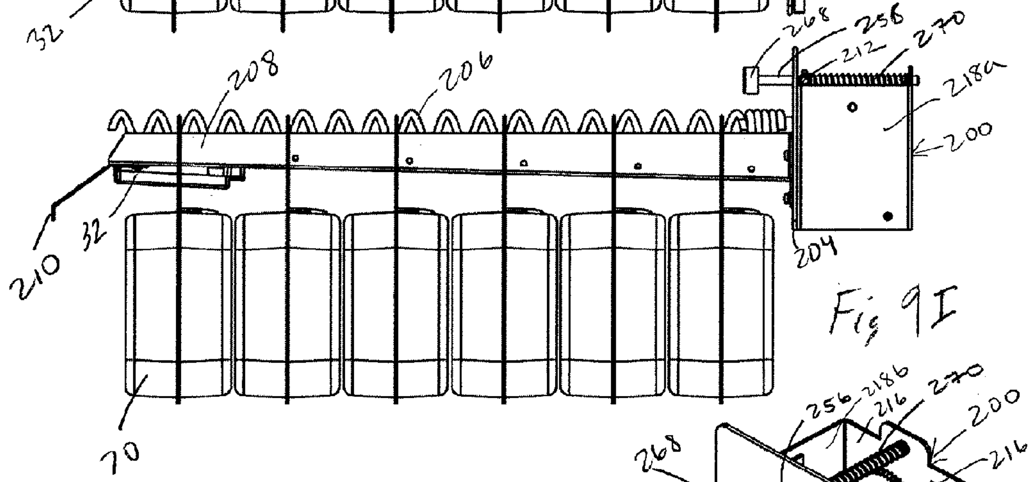
FIG. 9I is a side view of the first product holder of FIG. 9 shown full.
Figure 9G:
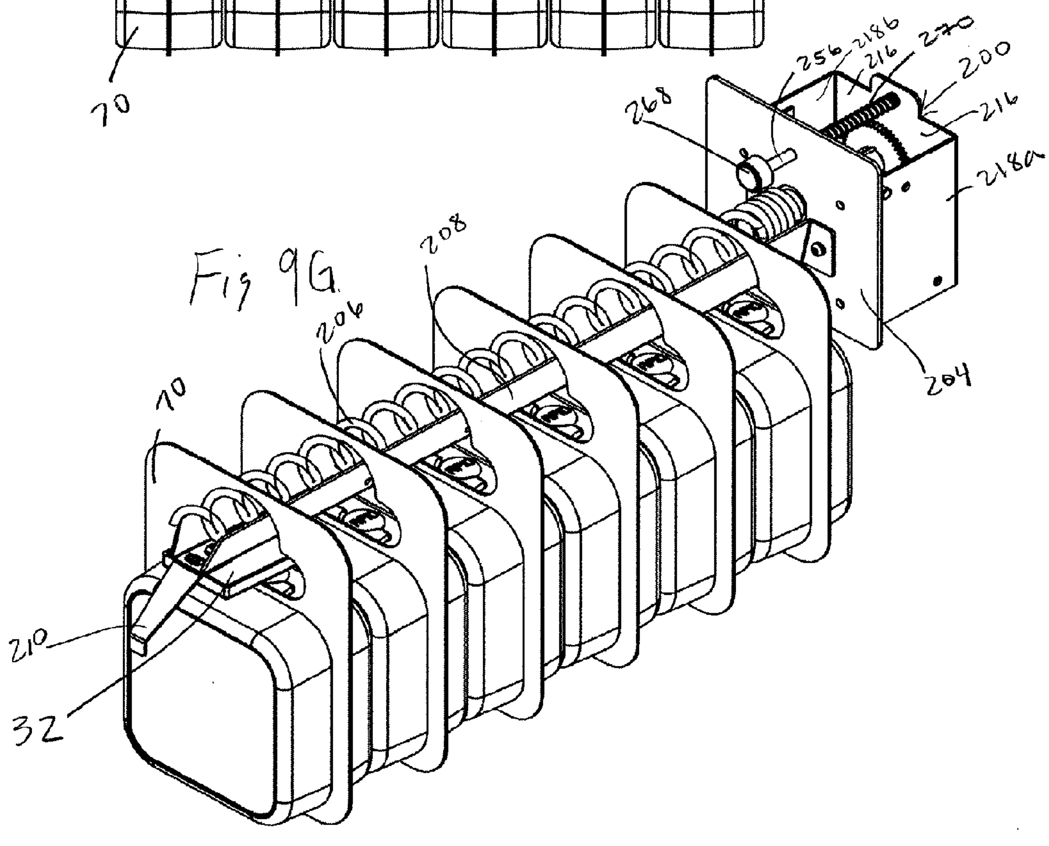
FIG. 9G is a perspective view of the first product holder of FIG. 9, which is shown full (i.e., with products hanging on the product holder).

The attachment assembly 212 includes a central hub 250 and two attachment bars 252*a* and 252*b* connected to the central hub 250. The attachment bars 252*a* and 252*b* extend outwardly from the central hub 250 in opposite directions, along a plane that is parallel to the cover plate 204. The central hub 250 defines a slot 254 configured to receive a pin 256. The pin 256 includes a front end 258 and rear end 260. The rear end 260 of the pin 256 is retained by and extends through a first pin receiving opening 262 defined by the rear wall 216 of the bracket 200. The pin 256 includes a retaining groove 264 located at a position near the front end 258 of the pin for retaining the attachment assembly 212 at that position on the pin 256. The front end 258 of the pin 256 passes through a second pin receiving opening 266 defined by the cover plate 204, which corresponds to and is aligned with the first pin receiving opening 262. In this manner, the pin 256 extends in a substantially straight line through the area defined by the walls of the bracket 216, 218*a*, and 218*b* and the rear surface 222 of the cover plate 204. The front end 258 of the pin 256 is connected to a push head 268 configured to facilitate pressing the pin further through the first pin receiving opening 262. As best seen in FIG. 9B, the portion of the pin 256 located between the position of the attachment assembly 212 and the rear wall 216 of the bracket 200 is encircled by a spring 270.

To attach or load a first product holder 28 into the vending machine 20, a user presses the push head 268, which causes the attachment bar 212 to move toward the rear wall 216 of the bracket 200, compressing the spring 270. The user may then position the first product holder 28 between two adjacent retaining tracks 90 of the racking mechanism 80. More particularly, the user positions the bracket 200 of the first product holder 28 within the product holder slot or receipt area 96 defined by the adjacent retaining tracks 90, such that the cover plate 204 is substantially flush with the retaining tracks 90. Once the first product holder 28 is in this position, the user releases the push head 268, which causes the spring 270 to recoil, forcing the attachment bars 252*a* and 252*b* into engagement with the grooves or teeth 98 of the retaining tracks 90. In one embodiment, the first product holders 28 are loaded into the vending machine 29 starting from the bottommost location of each product holder receipt area 96. However, it should be appreciated that the first product holders 28 may be loading into the vending machine 20 in any suitable order.

As discussed above, once the first product holder 28 is secured to the frame, the first product holder 28 may be removed and/or selectively repositioned up or down relative to the retaining tracks 90 that support it in the racking mechanism 80. To accomplish this, a user presses the push head 268 to causes the attachment assembly 212 to move or slide toward the rear wall 216 of the bracket 200, compressing the spring 270. This causes the attachment bar 212 to disengage from the grooves or teeth 98 of the retaining tracks 90. Once the attachment bar disengages from the grooves or teeth 98, depending whether the user wishes to reposition or remove the first product holder 28, the user may slide the first product holder 28 up or down along the retaining tracks 90 to a desired position or remove the first product holder 28 entirely from the racking mechanism 80. In this manner, the first product holders 28 may be easily repositioned and/or removed from the vending machine 20 without requiring the use of tools.

Referring now to FIGS. 11, 11A, 11B, 11C, 11D, 11E, and 11F, one embodiment a first product package 70 of the present disclosure is illustrated. In the illustrated embodiment, the first product package 70 includes a clamshell package having a front side 272 and a rear side 274 each with respective three-dimensional pocket areas for receiving a product (not numbered). The shape of the pocket may be any suitable shape for holding product. The clamshell package includes a hinged base 276 and a snap closure 278 so the package can be opened and resealed. The clamshell package defines opening 280 configured to receive the first product holder 28, the sensor holder 208 and the product guide bar 210 when the clamshell package is loaded onto the first product holder 28. The clamshell package includes a tag holding pocket 282 which is configured to hold a tag 284 (e.g., an RFID tag). In the illustrated embodiment, the RFID tag holding pocket 282 is located on the exterior of the clamshell package. In other embodiments, the RFID tag holding pocket 282 may be located in the interior of the clamshell package or in any other suitable location on the package 70. It should be appreciated that that the tag is secured in the tag holding pocket by a suitable adhesive or other fastening mechanism.

The front and rear sides 272, 274 of this clamshell package 70 are balanced so that, when the package is being held or suspended by the helix 206 of the first product holder 28, the clamshell package 70 and the RFID tag 284 attached to the clamshell package 70 may be held in a desired position relative to the first product holder 28. More particularly, the balanced clamshell package 70 enables the product sensor 32 attached to the clamshell package 70 to maintain a position suitable to be sensed by the product sensor 32 connected to the first product holder 28. It should be appreciated that, in certain embodiments, the sensor holder 208 of the first product holder 28 provides an additional source of balance to maintain the clamshell package 70 in a desired position when the clamshell package 70 is suspended by the helix 206. The shape and/or configuration of the sensor holder 208 restricts the ability of the clamshell package 70 to move when it is on the helix 206. This assists in making sure that the RFID tag 284 connected to the clamshell package 70 maintains a suitable position relative to the product sensor 32 connected to the first product holder 28.

In various embodiments, the clamshell package is formed of a suitable rigid, semi-rigid or flexible material. The clamshell package may be printed with, for example, a product name and/or instructions for use. The printed material may be on the exterior, or in the interior, or both of the clamshell package. Alternatively or additionally, an insert card may be included within the clamshell package to explain the uses and features of the product contained therein. It should be appreciated that the first product holders may be configured to accommodate multiple different types, sizes, and/or shapes of clamshell packages. It should also be appreciated that, in various alternative embodiments, one, a plurality, or each of the first product holders may accommodate clamshell packages of different types, sizes, and/or shape.

As discussed above and as shown in FIG. 7, in the illustrated embodiment, the vending machine 20 includes a plurality of second product holders 30. FIGS. 10, 10A, 10B, 10C, and 10D illustrate one embodiment of a second product holder 30 of the present disclosure. It should be appreciated that the following description of the second product holder shown in FIGS. 10, 10A, 10B, 10C, and 10D applies to each of the plurality of second product holders 30 of the vending machine 20. The second product holder 30 includes caged frame 104, a discharge unit 120 connected to the caged frame 104, a product sensor holder 102 in the discharge unit 120, and a product sensor 32 connected to the product sensor holder 102.

The caged frame 104 includes a first side 112, a second side 114, a third side 116, and a fourth side 118. These sides are connected to each other and define a dispensing chute 122 configured to hold or store a quantity of second product packages 72. The dispensing chute is configured to enable multiple second product packages 72 to be held by and to move through the caged frame 104 by gravity, from a first top end 124 of the caged frame 104 to a second botton end 126 of the caged frame 104. It should be appreciated that the caged frame 104 may be made of any suitably strong material such as steel. It should also be appreciated that the second product holder may be formed in other manners besides a caged frame.

The caged frame 104 includes a top section 130 that extends or inclines at an angle downward and rearwardly (i.e., toward the rear wall of the housing) and is configured to receive the second product packages 72 when the vending machine 20 is loaded, a central section 132 for holding the second product packages 72 and which is connected to the top section 130, and a bottom section 134 extending downwardly and toward the front (i.e., toward the door), configured to also hold the second product packages 72 and which is connected to the central section 132. The top section 130 of the caged frame 104 extends substantially along the top wall of the housing 22 and is located above the racking mechanism 80 which supports or holds the first product holders 28 within the vending machine 20. The central section 132 is positioned adjacent to the rear wall of the housing 22 and is located behind the racking mechanism 80. The bottom section 134 is located under the racking mechanism 80. In this manner, the caged frame 104 has a backward C-shaped structure, which partially encloses or surrounds the racking mechanism 80 positioned in front of it.

As best seen in FIG. 13, a discharge unit 120 (sometimes referrred to as a "product dispensing mechanism") is connected to the second end 126 of the caged frame 104. The discharge unit 120 includes a casing 140 which encloses a wheel assembly 142. The wheel assembly 142 includes a plurality of arms 144*a*, 144*b*, 144*c*, and 144*d* which define multiple compartments 146*a*, 146*b*, 146*c*, and 146*d*. Each of the compartments 146*a*, 146*b*, 146*c*, and 146*d* is configured to hold one of the second product packages 72. As illustrated in FIG. 13, a lowermost second product package is held by one of the compartments 146*b* of the wheel assembly 142. The discharge unit 120 further includes a dispensing flap 148, which is pivotably connected to the casing 140 of the discharge unit 120.

The casing 140 of the discharge unit 120 includes a sensor holder 102 configured to accommodate a product sensor 32. A product sensor 32 is connected to the sensor holder 102. It should be appreciated that the sensor holder 102 may be configured to accommodate one or more additional product sensors 32. In various alternative embodiments, one, a plurality, or each of the second product holders 30 may include multiple sensor holders 102 for holding multiple product sensors 32.

When one of the second product packages 72 is to be dispensed to a purchaser or consumer, the wheel assembly 142 is activated, which causes the lowermost second product package 72 to move toward the dispensing flap 148 of the discharge unit 120. The vending machine 20 causes the dispensing flap 148 to open and the lowermost second product package is ejected from the discharge unit 120. The ejected second product package 70 is released from the discharge unit 120 and is directed to the product delivery bin 62.

In this embodiment, the bottom portion 134 of the caged frame 104 has a sufficient slope for the second product packages 72 to slide under their own weight to take up the position of the second product package which is purchased by the consumer.

It should be appreciated that, unlike the first product packages 70 held or stored by the first product holders 28, the second product packages 72 are not dropped down into the product delivery bin 62. Instead, as purchases of the second product packages 72 are made, the second product packages 72 move through (or slide down) the dispensing chute 122 by gravity, traveling behind the network of first product holders 28. Each time a lower-most second product package 72 is dispensed (e.g., when a purchase is made), it is released from the discharge unit 120 and slides down into the product delivery bin 62. In this manner, the second product packages 72 are ideal for different types of products, such as more sensitive or fragile products. The second product packages 72 may be of any suitable shape for facilitating the movement of the second product packages 72 down through the caged frame 104. For example, cylindrical canisters or packages may be employed (as described in detail below) or any other suitable shape canister, container, or package.

As best seen in FIG. 7, the illustrated vending machine 20 includes five second product holders 30 in addition to the thirty six first product holders 28. It should be appreciated, however, that the vending machine may incorporate any suitable combination of first and second product holders 28 and 30, respectively, where the number and relative positions of the first and second product holders are readily adjustable to accommodate product packages of various shapes and sizes. Depending on the vending machine operator's desired configuration and the types of products being sold, the vending machine may be configured without the second product holders and instead, feature only the first product holders. In certain embodiments which only feature the first product holders, the first product holders may have an increased overall length to take advantage of the additional space made available in the product holding area by the removal of the second product holders. Increasing the depth of the product holding area enables longer first product holders to be employed, which provides greater inventory capacity. The vending machine of the present disclosure provides the ability to configure the vending machine to accommodate various types of merchandise at the discretion of the vending machine operator.

Referring now to FIGS. 12, 12A, 12B, 12C, 12D, 12E, and 12F, one embodiment the second product package 72 is illustrated. In the illustrated embodiment, the second product package 72 includes a canister or package having a flexible cylindrical side wall 150 formed by a sheet (not shown) wrapped around a rim 152, an at least partly rigid bottom 154, and a lid 156 for enclosing the product within the canister or package. The lid defines a slot 158. In various embodiments, the canister or package may be formed of any suitable rigid, semi-rigid or flexible material. The canister or package may be printed with, for example, the product name and/or instructions for use. The printed material may be on the exterior, in the interior, or both of the canister or package. Alternatively or additionally, an insert card may be included within the canister or package to explain the uses and features of the product contained therein.

The canister or package 72 includes a tag holding pocket 160 configured to hold a tag 284 (e.g., an RFID tag), which can be sensed by the sensors 32 of the second product holders 30. In one embodiment, the tag holding pocket 160 is located on the exterior of the canister or package 72. In another embodiment, the tag holding pocket 160 is located in the interior of the canister or package, such as in the cavity defined by the side wall 150 or on the inner surface of the lid 156.

Figure 10:
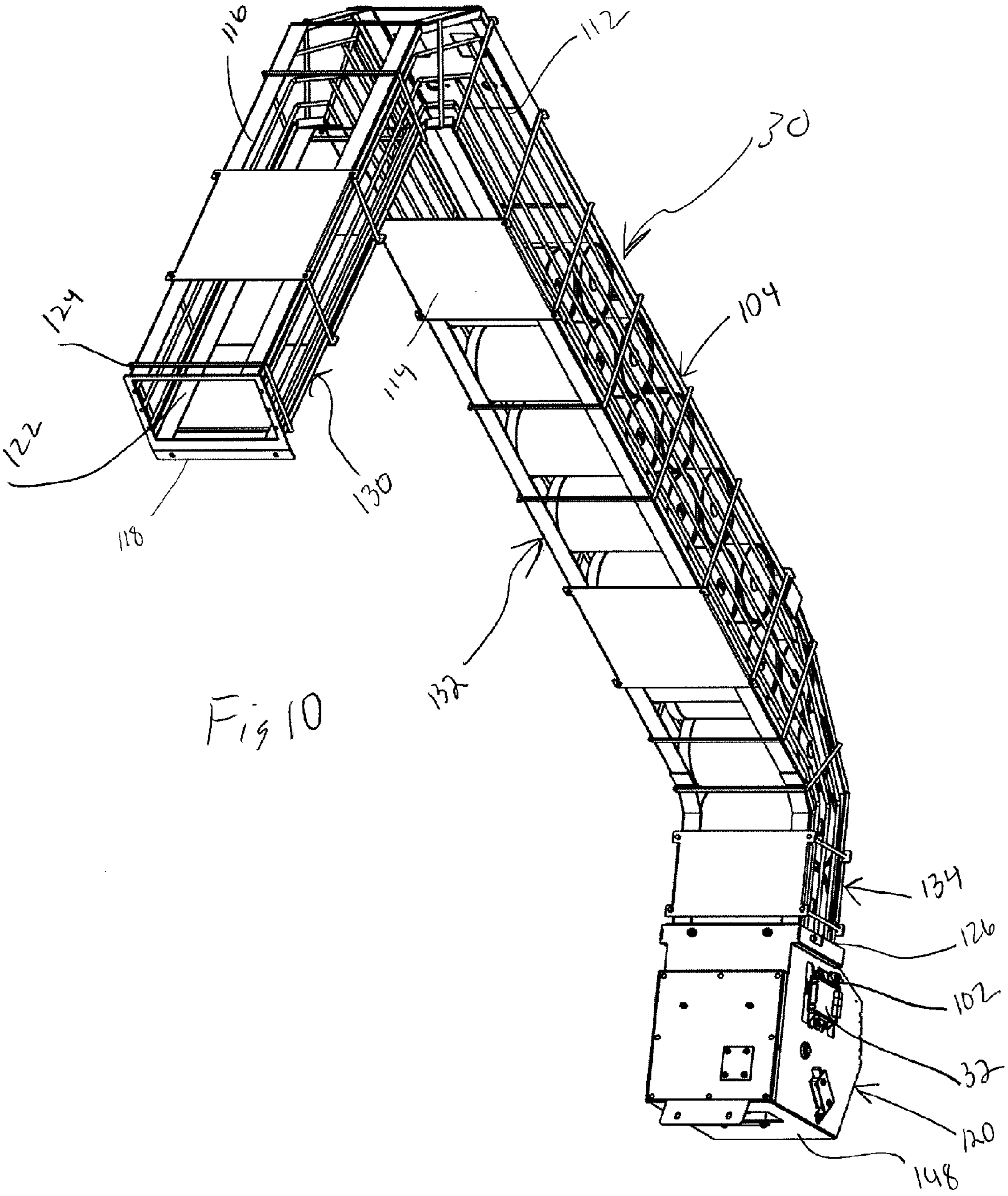
FIG. 10 is a perspective view of one of the second product holders of the vending machine of FIG. 1, which illustrates a product sensor connected to the product holder, and which is shown partially full (i.e., with some products in the product holder).
Figure 10A:
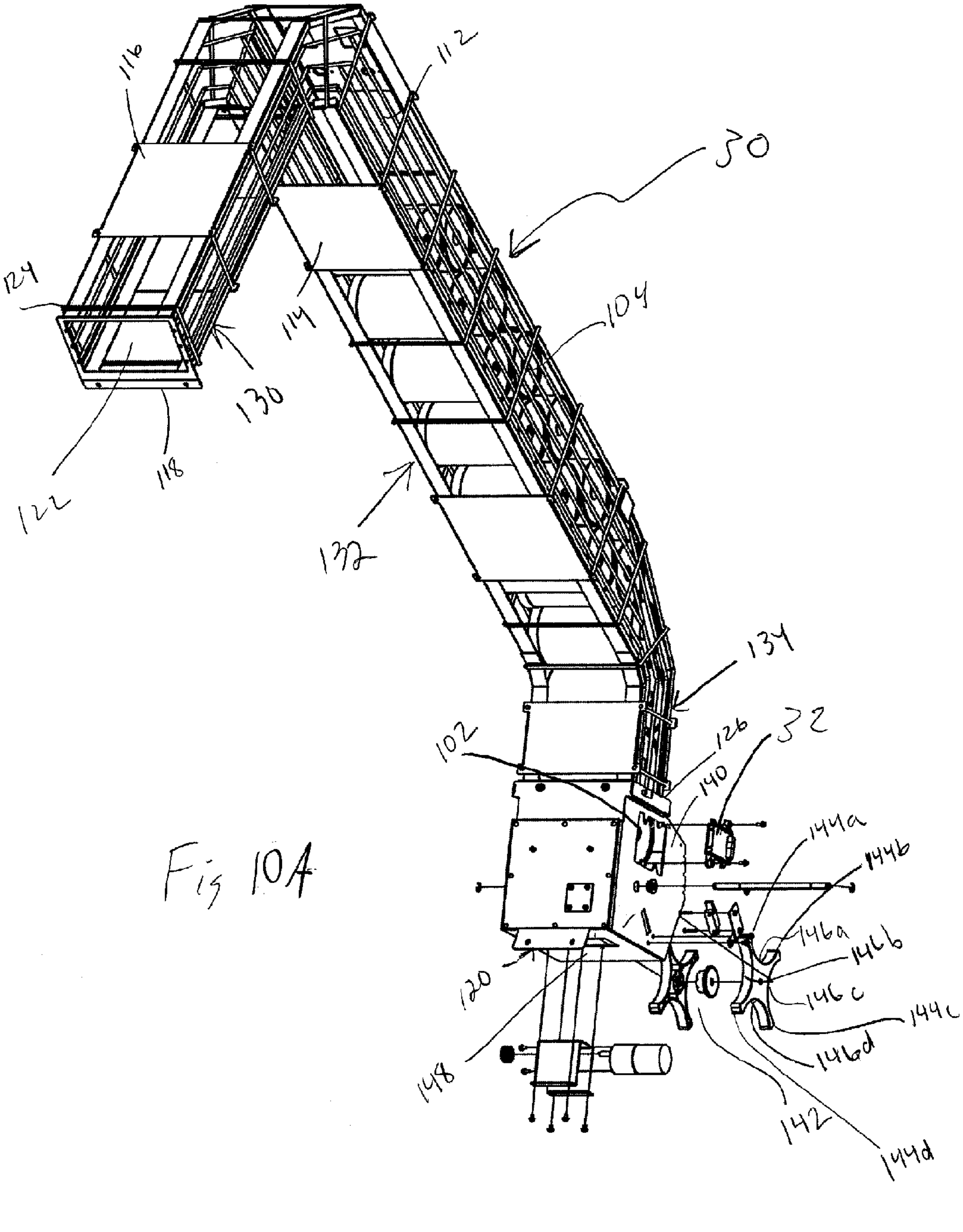
FIG. 10A is a perspective partially exploded view of the second product holder of FIG. 10.
Figure 10B:
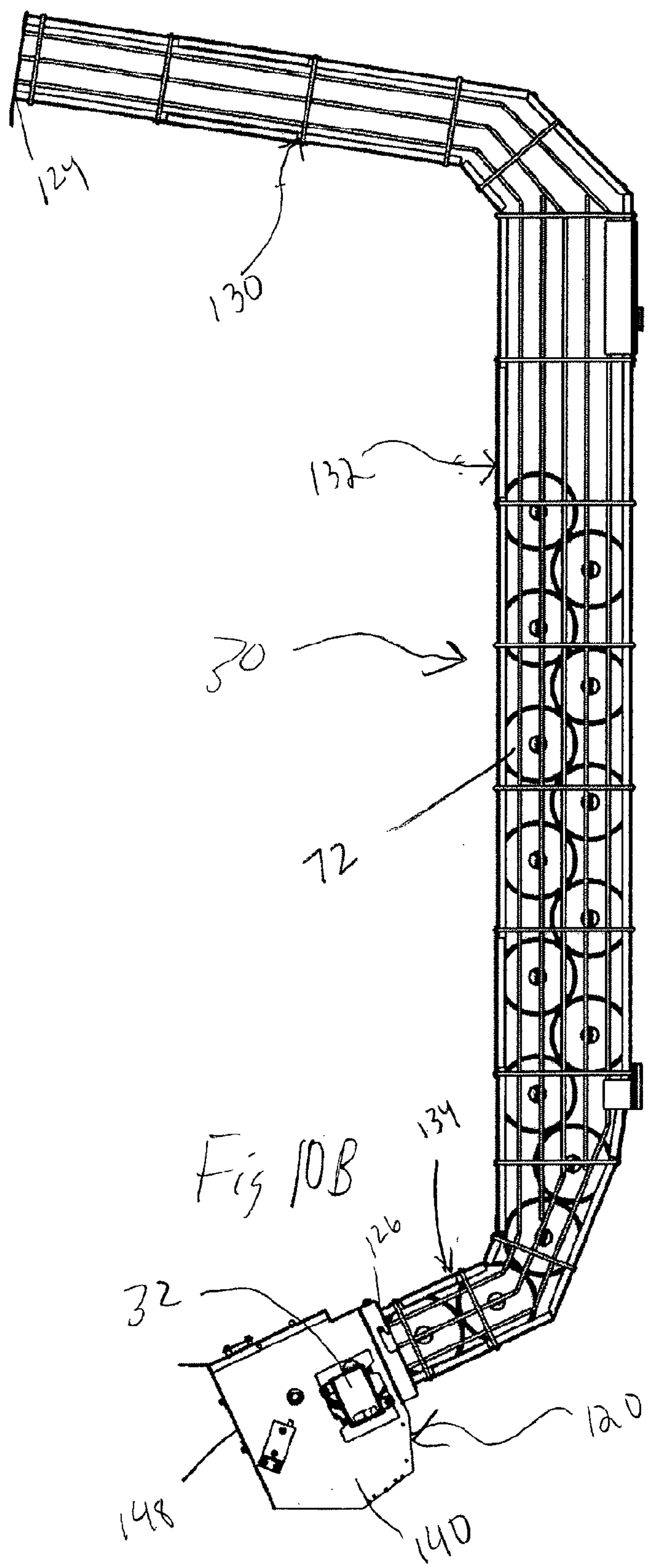
FIG. 10B is a right side view of the second product holder of FIG. 10.
Figure 10C:
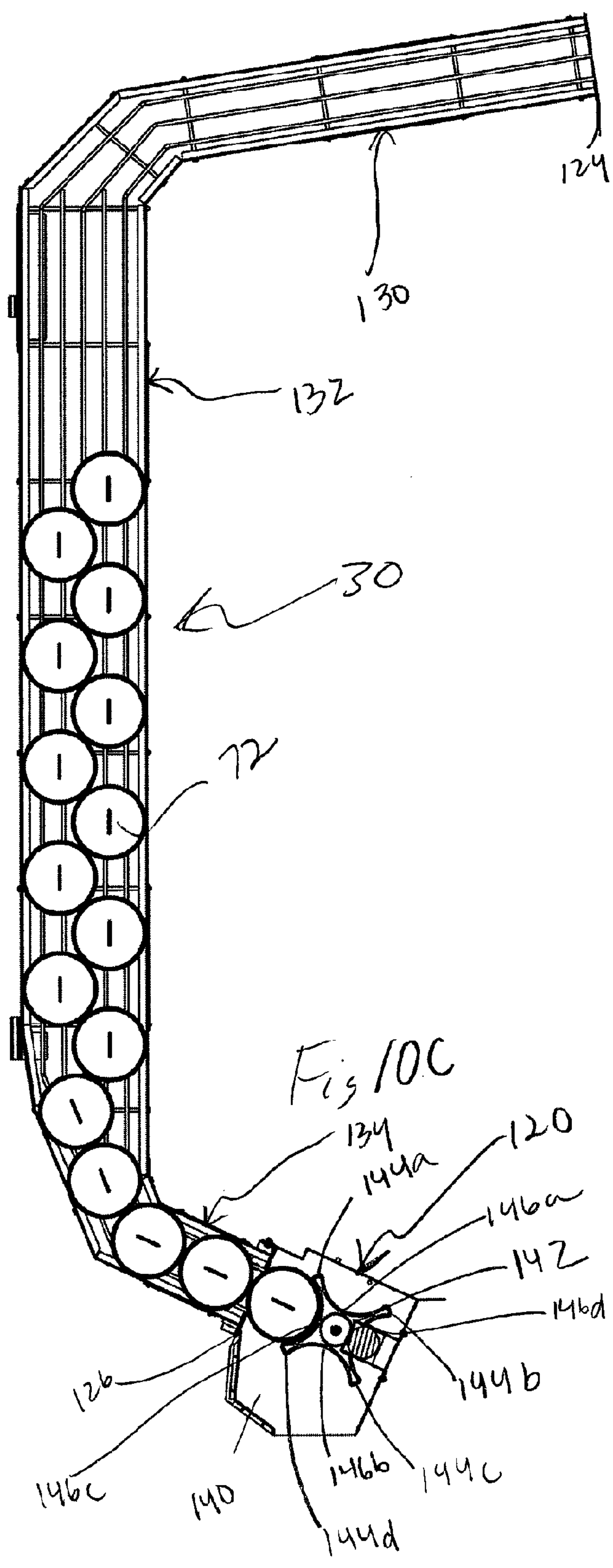
FIG. 10C is a left side view of the second product holder of FIG. 10.
Figure 10D:
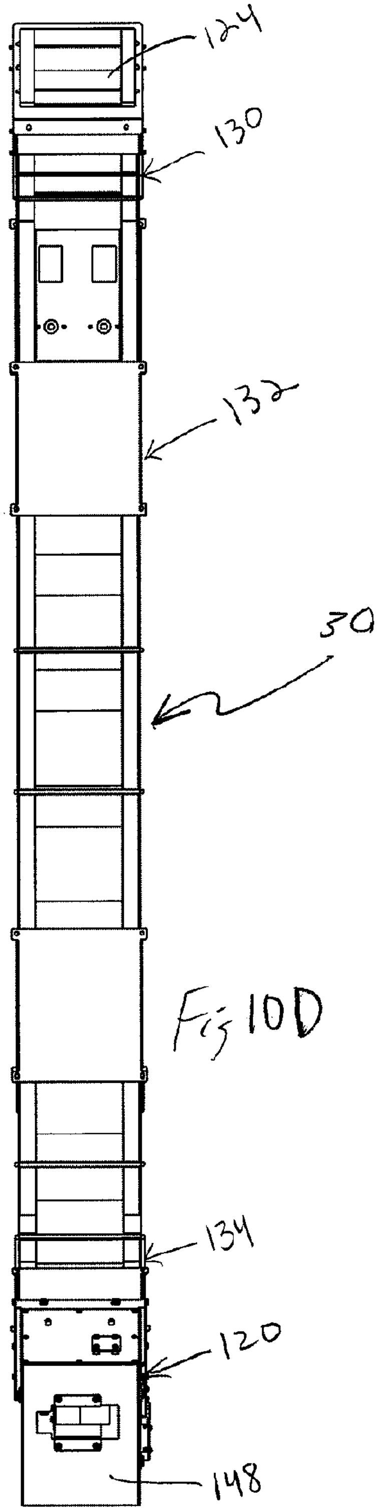
FIG. 10D is a front view of the second product holder of FIG. 10.
Figures 11, 11A, 11B, 11C, 11D, 11E, 11F:
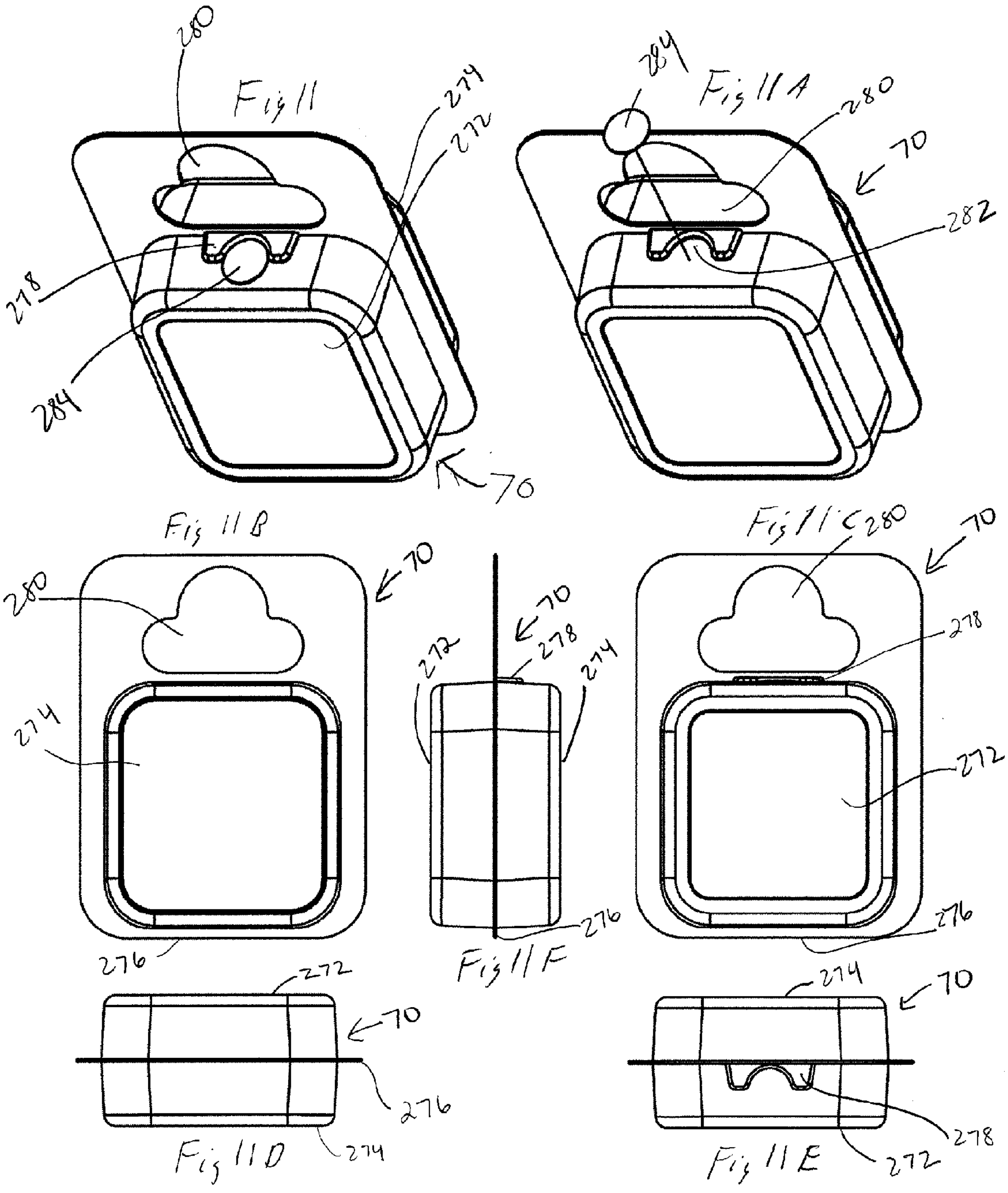
FIG. 11 is a top rear perspective view of the clamshell package of one embodiment of the present disclosure, and which illustrates an RFID tag attached to the package.
FIG. 11A is a top rear perspective view of the clamshell package of FIG. 11, and which illustrates the RFID tag removed from the package.
FIG. 11B is a front view of the clamshell package of FIG. 11.
FIG. 11C is a rear view of the clamshell package of FIG. 11.
FIG. 11D is a bottom view of the clamshell package of FIG. 11.
FIG. 11E is a top view of the clamshell package of FIG. 11.
FIG. 11F is a side view of the clamshell package of FIG. 11.
Figures 12, 12A, 12B, 12C, 12D, 12E:
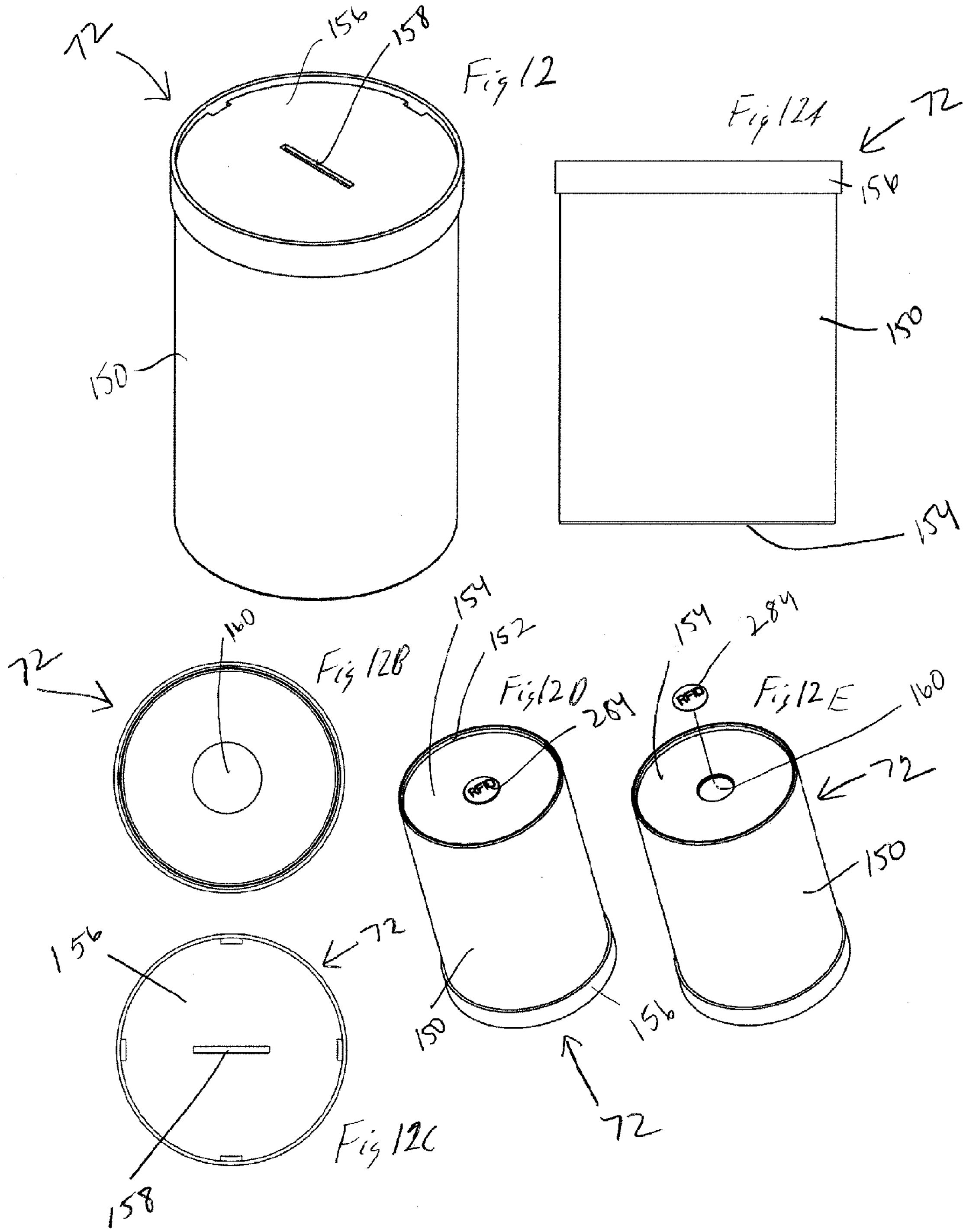
FIG. 12 is a perspective view of the cylindrical package of one embodiment of the present disclosure.
FIG. 12A is a side view of the cylindrical package of FIG. 12.
FIG. 12B is a bottom view of the cylindrical package of FIG. 12.
FIG. 12C is a top view of the cylindrical package of FIG. 12.
FIG. 12D is a bottom perspective view of the cylindrical package of FIG. 12 which illustrates an RFID tag attached to the package.
FIG. 12E is a bottom perspective view of the cylindrical package of FIG. 12 which illustrates an RFID tag removed from the package.

As the discharge unit 120 advances the second product package (e.g., the cylindrical canister) through the dispensing chute 122, the product sensor 32 connected to the dispensing unit 120 of the second product holder 30 senses the RFID tag 284 located on each of the second product package 72 as it positions for vending. The second product packages 72 are held in the vending machine 20, such that they are positioned in a suitable arrangement or position to ensure that the RFID tag 284 connected to each package 72 is aligned with and may be sensed by the product sensor 32 connected to the dispensing unit 120 of the second product holder 30 when that package 72 is located in the dispensing unit 120 and ready for vending. For example, as best illustrated by FIG. 10B, a plurality of cylindrical second product packages 72 are shown within the dispensing chute 122. Each of the second product packages 72 is oriented such that, when that canister enters the dispensing chute 120 to be vended, the bottom of the canister (which, in the illustrated embodiment, holds the RFID tag 284) will be aligned with the product sensor 32 located in the product sensor holder 102 of the dispensing unit 120.

Referring back to FIGS. 1 and 2, an illuminated signage display area 42 is mounted to the top of the support structure 66 of the door 34. The illuminated signage display area 42 is configured in one mode to display signage or other suitable content. In various embodiments, such content may include branding and merchandising and other information in video, text, animation, or any other suitable format.

A second electronic display device 38 is mounted to the support structure 66 below the illuminated signage display area 42. The second electronic display device 38 is configured in one mode to display advertising or other content, as further described below.

An illuminated physical product display area 40 is mounted to the support structure 66 below the second electronic display device 38. The illuminated physical product display area 40 is configured to display certain sample products. As described above, when the door 34 of the vending machine 20 is closed and the vending machine is in use by a consumer or purchaser, the vending machine 20 does not show or display the actual purchasable products to the consumer. The physical product display area 40 thus provides users with examples of what the products sold by the vending machine 20 look like and how the products interact with each other.

A first electronic combination display device and input device (e.g., touch screen) 36 is mounted to the support structure 66 below the illuminated physical product display area 40. The first electronic combination display device and input device 36 enables the user to select, customize and view, in real time, what the final product(s) will look like. After finalizing the product selections and customizations, the first electronic combination display device and input device enables the user to purchase the product(s). In one embodiment, the first electronic combination display device and input device 36 enables the consumer to interact with a video animation to select and customize one or more of the products. In one such embodiment, the vending machine enables a consumer to try various combinations of a product and one or more related or accessory products before purchasing those products, as further discussed below.

In the illustrated embodiment, a plurality of speakers 68 are mounted above the first electronic combination display device and input device 36, from which audible announcements concerning products to be vended may be provided and/or from which music or other sounds may be emitted to attract consumer or purchasers to the machine. It should be appreciated that the vending machine may include any suitable number or type of speakers. It should also be appreciated that the speakers may be provided at any suitable location on the vending machine.

A product retrieval area 46 is defined by the support structure 66 below the first electronic combination display device and input device 36. When a consumer desires to retrieve a purchased product from the product delivery bin 62, the consumer reaches through the product retrieval area 46 of the door 34. The consumer then retrieves the selected product from the bottom of the product delivery bin 62. In alternative embodiments, a bin access door may be pivotally attached to the support structure of the door in alignment with the product retrieval area 46 of the door. In such embodiments, when a consumer desires to retrieve a purchased product from the product delivery bin 62, the consumer manually pushes inwardly on the bin access door to retrieve the selected product from the product delivery bin 62.

While the components of the door 34 describe above are shown in one particular arrangement, the present disclosure is not limited to the arrangement shown. It should be appreciated that the various components of the door described above could be in different locations on the door. In various embodiments, the components of the door 34 are modular and may be arranged in any suitable order or configuration. Additionally or alternatively, certain of these components may be left out. For example, in certain embodiments, the vending machine does not include the illuminated signage display area 42 or the physical product display area 40.

The illustrated vending machine 20 further includes a payment receiver 44 mounted to the support structure 66 of the door 34, which may be configured to receive payment from a consumer or purchaser in various forms, including, e.g., bills, coins, credit card, debit card, smartcard, wireless authorization (e.g., via cell phone), or the like. The payment receiver 44 may, according to some embodiments, comprise any number and/or configuration of devices and/or components for receiving payment and/or dispensing change, including a coin acceptor, a bill validator, a card reader (e.g., a magnetic stripe reader), and/or a change dispenser. In some embodiments, a magnetic stripe card reader may read data on a magnetic stripe of a credit or debit card, for example, and it may cooperate with conventional credit card processing equipment to validate card-based purchases through a conventional transaction authorization network. In some embodiments, a coin acceptor, bill validator and/or change dispenser may communicate with and/or be coupled to a currency storage apparatus (a "hopper", not shown). Coin acceptors and/or bill validators may receive and validate currency that is stored by the currency storage apparatus. A bill validator or coin acceptor may be capable of monitoring stored currency and maintaining a running total of the stored currency. According to some embodiments, a change dispenser activates the return of money to the consumer where appropriate.

The illustrated vending machine 20 includes a receipt distributor 50 attached to the support structure 66 of the door, which is configured to provide various paper documents such as receipts or transaction records for credit/debit purchases. The receipt distributor 50 may be directed and customized to dispense informative information, such as through on screen prompt requests, including coupons, tickets, advertising materials, and/or service data, in addition to receipts. In certain embodiments, the receipt distributor may be configured to use or accommodate rolled paper, thermal paper, or hard stock paper, such as for printing event tickets or the like.

In one embodiment, the vending machine includes an optical bar code reader to detect machine readable bar codes and/or product characteristics. The vending machine may set data required for vending the articles based on the reading of the bar codes from the bar code reader and may manage sales information regarding the articles based on the bar codes read by the bar code reader. In one embodiment, access to the vending machine may be made via a personal identifier card with a bar code reader or a magnetic strip identifier. In another embodiment, access is through a biometric identifier such as a fingerprint reader, iris scanner, face recognition software or voice identification software, or any other suitable identifier.

In one embodiment, the vending machine includes a camera to view the customers, to monitor activities occurring around the vending machine for security purposes, and to interrelate with the touch screen and product holders. In one embodiment, the camera is installed inside the housing 22 such that only a lens is exposed outside. A digital camera, a video camera or any other suitable camera may be employed.

As illustrated schematically in FIG. 13, the components of the vending machine 20, including one or more input devices 302 (e.g., touch screen), output devices 304 (e.g., display devices, speakers, receipt distributor), the payment receiver 44, the product holders 28 and 30, and the product sensors 32, communicate with and are controlled by at least one processor 301.

The processor 301 is in communication with or operable to access or to exchange signals with at least one data storage or memory device 306. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein. In one embodiment, the processor and the memory device reside within the housing of the vending machine. In various embodiments, the processor 301 and the memory device 306 may each be located entirely within a single computer or other device or may be connected to each other by a remote communication medium, such as a serial port cable, a Local Area Network (LAN), a telephone line, a fiber optic connection or any other suitable communication medium.

The memory device 306 may store one or more programs 210 executable by the processor 301, to control the vending machine 20. The processor 301 performs the instructions of the program 310, and thereby operates in accordance with some embodiments described herein. In one embodiment, part or all of the program code and/or operating data can be stored in a detachable or removable memory device, including, but not limited to, a suitable cartridge, disk, CD ROM, DVD, or USB memory device. In other embodiments, part or all of the program code and/or operating data described above can be downloaded to the memory device 206 through a suitable network.

In addition to the program 310, one or more memory devices such as memory device 306 also stores other data which relates to the use, control, and management of the vending machine. The memory device 306 may be configured to store data or information, such as (i) product inventory data 312 (e.g., the number and type of goods in the vending machine); (ii) sales or transaction history data 314, (iii) menu system data 316 (e.g., pictures and prices of goods, buying procedure, messages to display with animation and/or sound); (iv) attract media and text data 318 (e.g., the animation and/or sound provided when the vending machine is idle); (v) money data 320 (e.g., amounts received from selling products; total amount received for year, month, or at collection time, etc.); (vi) date and time data 322 (e.g., the time stamp for most input data), and/or (vii) sales rules data 324 (e.g., price for additional product or product accessories, combination packages, etc.)

The processor 301 may be configured to communicate with a communication device 308 through which the processor 301 may communicate, in accordance with some embodiments, with other devices such as one or more peripheral devices, one or more servers, and/or one or more user devices. The communication device 308 may include any suitable type or configuration of communication port, cable, modem, and/or signal transceiver.

Figure 14:
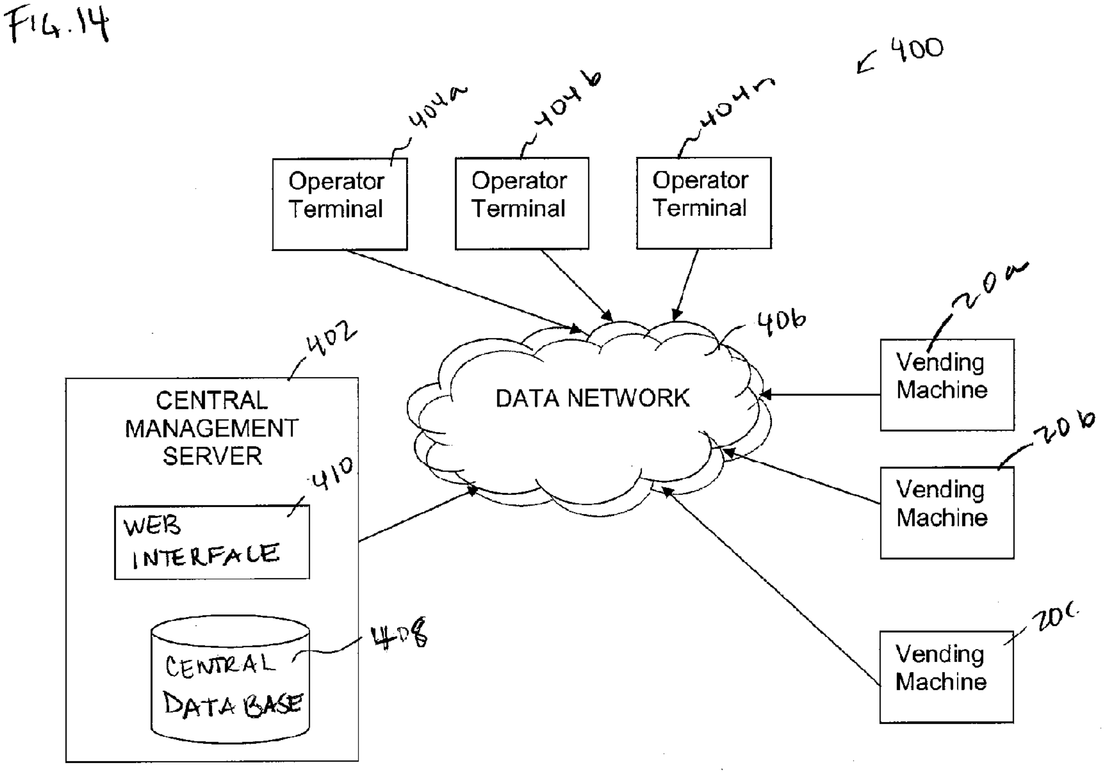
FIG. 14 is a schematic diagram of the central management server in communication with a plurality of vending machines and a plurality of operator terminals or devices in accordance with one embodiment of the present disclosure.

Referring now to FIG. 14, in various embodiments, a system 400 includes a central management server 402 configured to communicate with one or more vending machines 20*a*, 20*b* . . . 20*n* and/or operator terminals or devices 404*a*, 404*b* . . . 404*n* through a data network or remote communication link 406. The central management server 402 may include any suitable server or computing device having at least one processor and at least one memory or storage device.

The data network 406 may include one or more communication networks. Among these may be the Internet, a local area network (LAN), a wide area network (WAN), a telephone line, a telecommunications cable, a radio channel, an optical communications link, an infrared communications channel and a satellite communications link. Although the data network 406 is illustrated as being a single network, it may be made up of a number of different data networks and computer systems for facilitating communication between various ones of the other components of the system.

The central management server 402 receives communication from the vending machine(s) 20*a*, 20*b* . . . 20*n* and also transmits information to the vending machine(s) 20*a*, 20*b* . . . 20*n* via the network 406. For example, when a transaction is performed at the vending machine(s) 20*a*, 20*b* . . . 20*n*, transaction data such as the type of product purchased is transmitted from the vending machine(s) 20*a*, 20*b* . . . 20*n* to the central management server 302 via the network 306. In various embodiments, each vending machine 20*a*, 20*b* . . . 20*n* transfers or transmits data to the central management server 402 on demand via a remote data port and/or ethernet connection.

The central management server 402 is in communication with a central database 408. The central management server 402 is configured to receive data from the vending machines, process the data and store the data into a central database 408. For example, the central database 408 stores inventory data for each vending machine.

In certain embodiments, the system 400 may also include a financial server (not shown) to facilitate the processing of financial information via the network 406. For example, the system 400 may facilitate the processing of credit card and debit card information, so that purchasers of the vending machine products do not have to deal directly with credit and debit card companies. When a user interfaces with the vending machine and provides financial information such as a credit card number, that information is transmitted from the vending machine via the network 406. In one embodiment, the financial information is transmitted directly from the vending machine to the financial server. In another embodiment, the information is transmitted to the management center or server first, and is then transmitted to the financial server. In these embodiments, financial server is responsible for processing the financial information received from the user at the vending machine. In another embodiment, financial server software is included in the central management server, and financial transactions are performed by the central management server without a separate financial server.

The central management server 402 and central database 308 are accessible by one or more operator terminals or devices 404*a*, 404*b* . . . 404*n*, such as the personal computer of a vending machine operator or administrator. Each of the operator terminals or devices 404*a*, 404*b* . . . 404*n* includes software and hardware, such as a display monitor, a keyboard and mouse and a microprocessor. Each operator device 404*a*, 404*b* . . . 404*n* also includes internet browser software. Using the internet browser software, a vending machine operator or administrator at the operator device 404*a*, 404*b* . . . 404*n* can access a web interface 410 through the central management server 402. Through the internet browser software, the operator device 404*a*, 404*b* . . . 404*n* communicates with the central management server 402 and enables the vending machine operator or administrator to login to a central command functionality of the management center or server 402 and to view and modify data stored in the central database 408. The web interface 310 also enables the vending machine operator or administrator to perform certain system functions, which may affect the inventory and operation of the vending machine(s) 20*a*, 20*b* . . . 20*n*.

In one embodiment, the system 400 enables vending machine operators to remotely set-up, review, update, modify, and manage various aspects of the vending machine.

Figure 15:
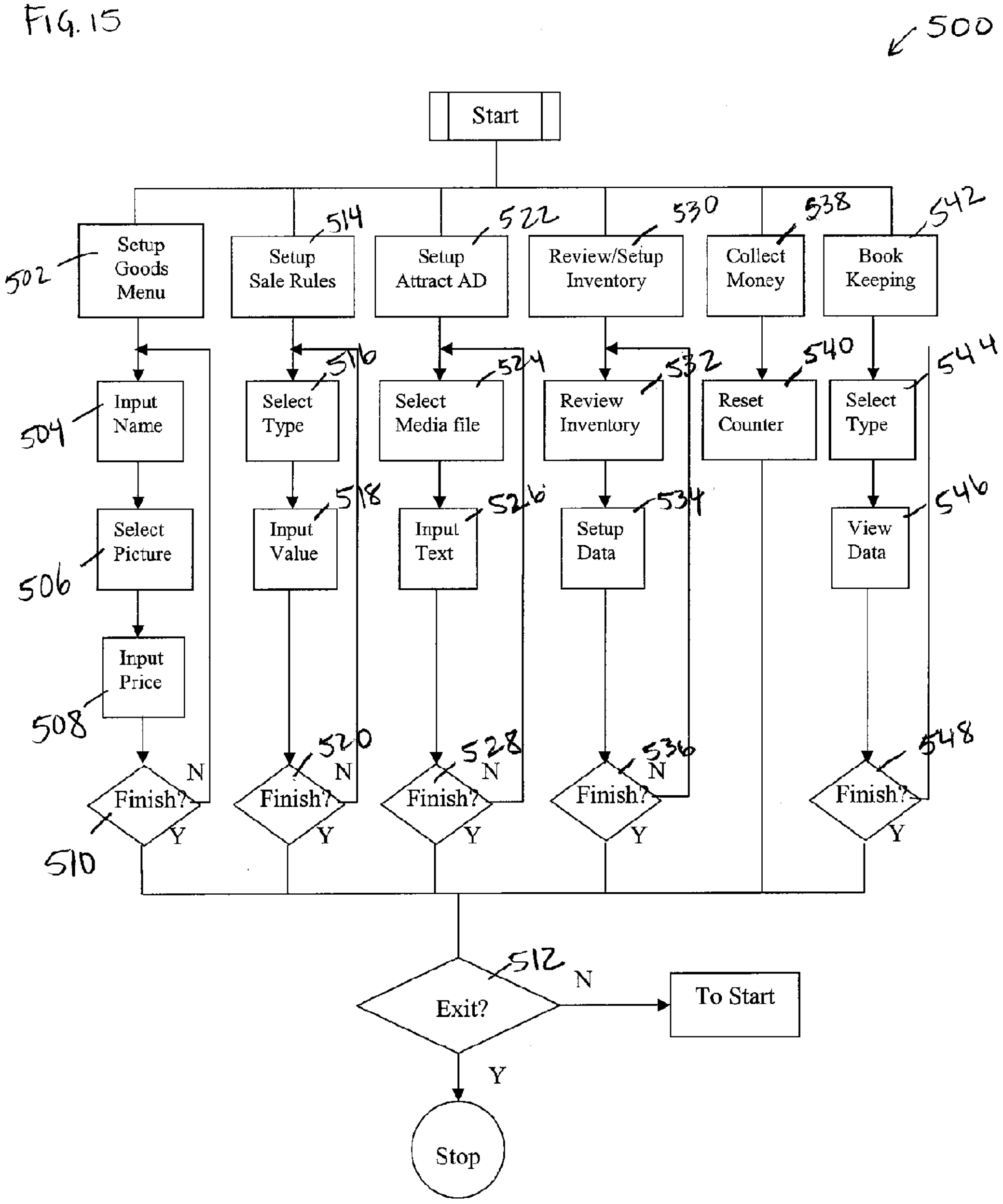
FIG. 15 is a flow chart illustrating one example process for performing operator set-up of the vending machine in accordance with one embodiment of the present disclosure.

For example, as illustrated in FIG. 15, the system 400 may enable the vending machine operator to remotely set-up or establish the goods menu (block 502) by enabling the vending machine operator to: (i) input the name for a product being offered for sale (block 504); (ii) select a picture to be displayed to depict the offered product (block 506); and (iii) input the price for the offered product (block 508). The system determines whether the vending machine operator has indicated that he or she is finished (diamond 510) with the goods menu set up. The system enables the vending machine operator to repeat steps 504 to 508 for each different product and, when the determination is made that the vending machine operator is finished, the system enables the vending machine operator to exit the set up (diamond 512).

The system 400 may enable the vending machine operator to remotely set-up or establish the sale rules (block 514) by enabling the vending machine operator to: (i) select a product type (block 516); and (ii) input a value (block 518). For example, the vending machine operator may input detailed product information, such as size, weight, and/or benefits. The system 400 determines whether the vending machine operator has indicated that he or she is finished (diamond 410) with the sale rules set up. The system 400 enables the vending machine operator to repeat steps 516 to 518 for each different product type and, when the determination is made that the vending machine operator is finished, the system 400 enables the vending machine operator to exit the set up (diamond 512).

The system 400 may enable the vending machine operator to remotely set-up the attract features (block 522) of the vending machine (e.g., the music and/or advertising that is provided, such as when the vending machine is idle) by enabling the vending machine operator to: (i) select a media file (block 524); (ii) input text (block 526); (iii) change product graphics, such as, for example, video, pdf, wavfile files; and/or (iv) change product presentation audio. The system 400 determines whether the vending machine operator has indicated that he or she is finished (diamond 510) with the attract features set up. When the determination is made that the vending machine operator is finished, the system enables the vending machine operator to exit the set up (diamond 512).

The system 400 may enable the vending machine operator to conduct remote reviews and set up of the inventory (block 530). For example, the vending machine operator can remotely change the current product matrix stocked in the machine and the details related to the pricing of these items.

The system 400 may enable the vending machine operator to collect money (block 538). For example, the machine may be configured to accept credit or debit cards, paper script and/or coin individually or in combination. Additionally, the vending machine may be configured to accept all major world currencies.

The system 400 may enable the vending machine operator to perform various accounting or bookkeeping functions (block 542). For example, the machine can track: (i) the number of times the door of the vending machine is opened; (ii) the time at which the door is opened; (iii) the dates and times the door is opened; (iv) the number of times the door is opened on any given date or for a designated period of time (such as an hour, a week or a month); (v) sales and combination vends including specific time and dates of each transaction; (vi) sales made by credit card, debit cards, paper script and/or coin; (vii) sales by a particular product dispenser or holder (e.g., a particular helix); (viii) the sales by a type of product dispenser or holder (e.g., helix or dispensing chutes); (ix) the number of steps a consumer took to complete a vend; (x) the interface between host and consumer (particularly for advertising); or (xi) any combination of these.

The system 400 may enable the vending machine operator to conduct remote tests and/or remotely address issues with the vending machine.

The system 400 may enable the vending machine operator, via commands, to remotely add, delete or replace content, services, menus, advertisement, software programs and patches, etc. For example, the system 300 may enable the vending machine operator to adjust prices, change or modify the products being offered for sale, change or modify the advertising displayed or the music/sounds played by the vending machine, etc., as desired by vending machine operator. In one embodiment, the vending machine may be updated with software at any time through a USB flashport or downloaded, such as though an Ethernet connection.

In one embodiment, information regarding inventory, vending activity, accounting (such as the processing of credit and debit card purchases), and/or other information is transmitted to the management server 402. In one such embodiment, the transmission of such information occurs in real time. The management server 402 utilizes the information to generate detailed reports on operational, business and performance data relating to the vending machine.

Figure 16:
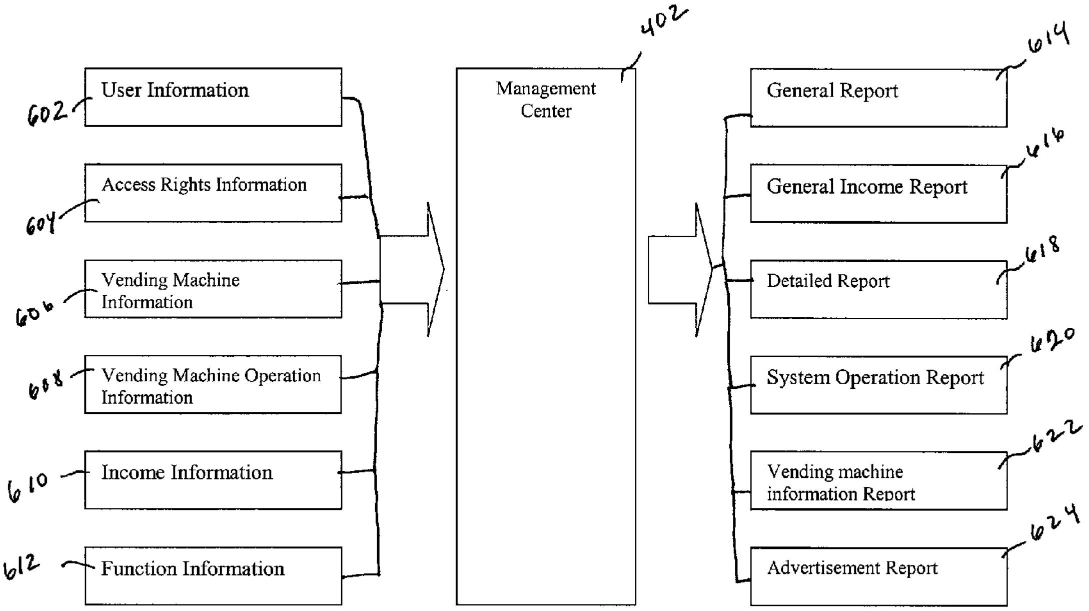
FIG. 16 is a block diagram illustrating different examples of reports which may be output by the central management server.

As illustrated in FIG. 16, in one example embodiment, the central management server 402 receives information, including one or more of: (i) user information 602; (ii) access rights information 604; (iii) vending machine information 606; (iv) vending machine operation information 608; (v) sales information 610; and (vi) function information 612. The central management server 402 utilizes such information to produce one or more reports, such as general reports 614, general sales or income reports 616, detailed reports 618, vending machine system operation reports 620, vending machine information reports 622, and advertisement reports 624. In various embodiments, such reporting may occur according to a predetermined schedule or by query.

The operation and use of the vending machine 20 by a purchaser or consumer will now be described in relation to FIGS. 17 and 18A to 18D.

Figure 17:
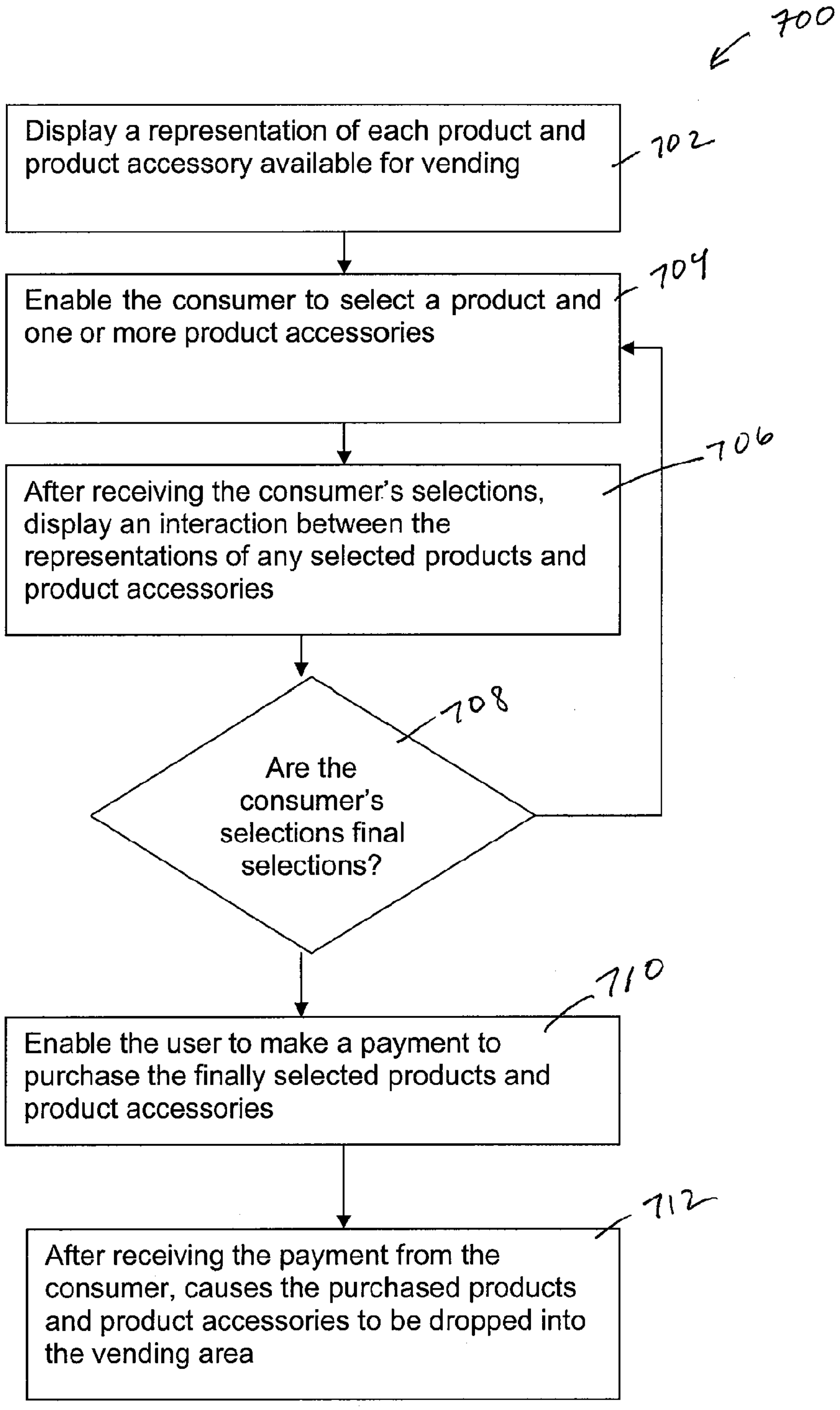
FIG. 17 is a flow chart illustrating an example process for handling a consumer transaction at the vending machine in accordance with one embodiment of the present disclosure.

FIG. 17 illustrates an example process 700 for handling a consumer transaction at the vending machine in accordance with one embodiment of the present disclosure. In this example, the vending machine offers a plurality of products and various coordinating product accessories. As indicated by block 702, the vending machine displays a representation (e.g., a picture or image) of each product and product accessory that is available for vending.

It should be appreciated that, in one embodiment, in addition to the hardware and the mechanical devices that store, dispense, count, and/or identify the products available for vending to the consumer, the vending machine includes an inventory management system. In one such embodiment, the vending machine utilizes software-controlled sensing technology, such as RFID technology, to ensure that only products that are available for immediate vending or purchase are displayed by the display device and offered or selectable by the user (i.e., the vending machine will not display what it cannot immediately vend). The vending machine utilizes such software-controlled sensor technology to automatically update the offering of products (e.g., automatically add items which become available to what is being offered to the user via the display device). The vending machine will not falsely represent items which are not in inventory and will prevent such items from being displayed to the consumer in certain embodiments. In one embodiment, products or items which become available will automatically be added to the displayed offering of products. In one embodiment, these functions are performed in real time through the software-controlled sensor technology which fully monitors vending machine's inventory at all times.

In one embodiment, the vending machine includes a software-controlled product tracking system, which utilizes sensing technology, such as RFID technology, to ensure that only authorized, approved products may be featured in the vending machine for vending. Through product sensors 32 (e.g., RFID sensors) at each of the first and second product holders, the vending machine verifies that each product in inventory has the authorized RFID tag.

In this embodiment, the vending machine does not recognize any product or item which does not include the RFID tag. Any attempts to operate unauthorized product (e.g., product without the appropriate RFID tag) will result in the vending machine purging that unauthorized inventory upon power up and re-stocking. In one embodiment, the product tracking system enables tracking of products going in and out of the vending machine, as well as in and out of a brick and mortar store at which the vending machine is located.

In one embodiment, the vending machine conducts automatic self-checks to verify that each product in inventory has an authorized sensor (e.g., RFID sensor or tag). In various embodiments, the automatic self check of the system inventory occurs each time the power is cut to the vending machine and/or each time the door is opened and closed. However, it should be appreciated that the self-check may occur at any suitable time, such as at designated time intervals or in response to a vending machine operator request, as further described below. In one such embodiment, during the self-check, the system runs a self policing review of all product holders. For example, for the first product holders, the system causes the helices of the first product holders to rotate to advance any product present at each location. When an authorized product has been identified "present" for any given first product holder location, the helix is stopped and that location is identified as "ready." Any unauthorized product suspended on any helix is advanced until it is dispensed from the vending machine. In certain embodiments, each time the door is opened or closed for servicing that action is tracked. The vending machine may require a user to provide suitable identification in order to gain access to the vending machine to perform the servicing functions.

Turning back to FIG. 17, as indicated by block 704, the vending machine enables the consumer to select a product and one or more product accessories. As indicated by block 706, after receiving the consumer's selection, the vending machine displays an interaction between the representations of any selected products and product accessories. In one embodiment, the vending machine enables the user to interact with a video animation via the first electronic combination display device and input device (e.g., touch screen) to select and customize a product. The vending machine enables the user to try various combinations of the product and one or more of the related or coordinating accessory products via first electronic combination display device and input device before purchasing the products, as described in detail below.

As indicated by diamond 708, after displaying the interaction between the representations associated with any selected products and product accessories, the vending machine determines whether the consumer's selections are final selections. If the determination is made that the consumer's selections are not final selections, the vending machine enables the consumer to continue making selections from among the available products and product accessories and displays the interactions between any selected items, as indicated by blocks 604 and 606, respectively.

As indicated by block 710, if the determination is made that the consumer's selections are final selections, the vending machine enables the user to make a payment to purchase the finally selected products and product accessories.

As indicated by block 712, after receiving the payment from the consumer, the vending machine causes the purchased products and product accessories to be dispensed into the product delivery bin 62 of the vending machine for access by the consumer.

Referring now to FIGS. 18A to 18D, in one example embodiment, the vending machine provides a consumer or purchaser with the ability to select and customize a primary product (e.g., a toy) with various secondary products (e.g., toy accessories, attachments, decorations, and/or enhancements) via a combination display device and touch screen 36.

Figure 18A:
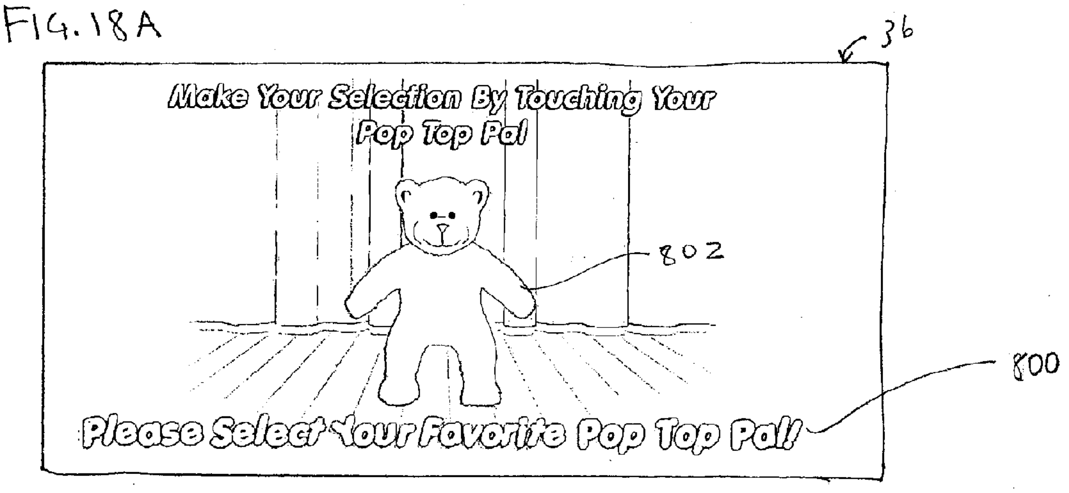
FIGS. 18A, 18B, 18C, and 18D are a series of example screen shots which illustrate the operation of the combination display device and touch screen and which show how a user can select purchase related products from the vending machine.

FIG. 18A illustrates an example combination display device touch screen 36 of the vending machine 20 at the begin of a consumer's shopping experience. The combination display device touch screen 36 displays a message 800 to the consumer prompting the consumer to input a selection of a primary product. More particularly, in the illustrated embodiment, the combination display device touch screen 36 displays an image of a stuffed bear toy 802 which is being offered by the vending machine 20. The message 800 displayed by the vending machine 20 prompts the consumer to select the bear 802 to begin the shopping experience. In one embodiment, the vending machine 20 offers one type of toy that may be customized with one or more toy accessories as desired by the consumer. In another embodiment, the vending machine 20 may offer a plurality of different types of toys, such as bears of different colors, sizes, or construction quality. It should be appreciated that although this example incorporates a vending machine 20 which offers stuffed bears and related accessories, the toys are not limited to bears and may include any suitable type of toy. Additionally, the vending machine 20 may offer any suitable type of product(s) or product line(s).

In one embodiment, the vending machine 20 enables the consumer to use the combination display device touch screen 36 to view or scroll through various images of the toys (or other items) offered by the vending machine. In another embodiment, the images for each or a plurality of the toys (or other items) offered by the vending machine 20 may be simultaneously displayed to the consumer. In one such embodiment, small images of the toys may be initially displayed to the consumer. Using the touch screen 36, the consumer can select a toy to enlarge the image for that toy and get a better look at the toy. After the consumer selects the toy, the consumer will have the opportunity to select one or more related accessory products for the toy.

Although not shown, in some embodiments, as the consumer interacts with the displayed products via the combination display device touch screen 36 and inputs product selections, the vending machine 20 causes a second electronic display device 38 in the door 34 of the vending machine 20 to display certain content based on the consumer's actions or inputs. For example, the vending machine 20 may offer a variety of stuffed animals, including a lion, a tiger, and a bear. If the consumer selects the lion, the vending machine 20 generates or retrieves content relating to lions (such as a trailer or advertisement for a movie about lions) and causes the second electronic display device 38 to display such content to the consumer. In this manner, the second electronic display device 38 and the combination display device and touch screen 36 interact as the consumer makes product selections to provide a more interactive and personalized shopping experience. It should be appreciated that the vending machine 20 may utilize any suitable type of information or data such as information or date received from or by the consumer (e.g., information about the consumer's characteristics, preferences, purchasing history, etc.) to customize or personalize the consumer's shopping experience.

Figure 18B:
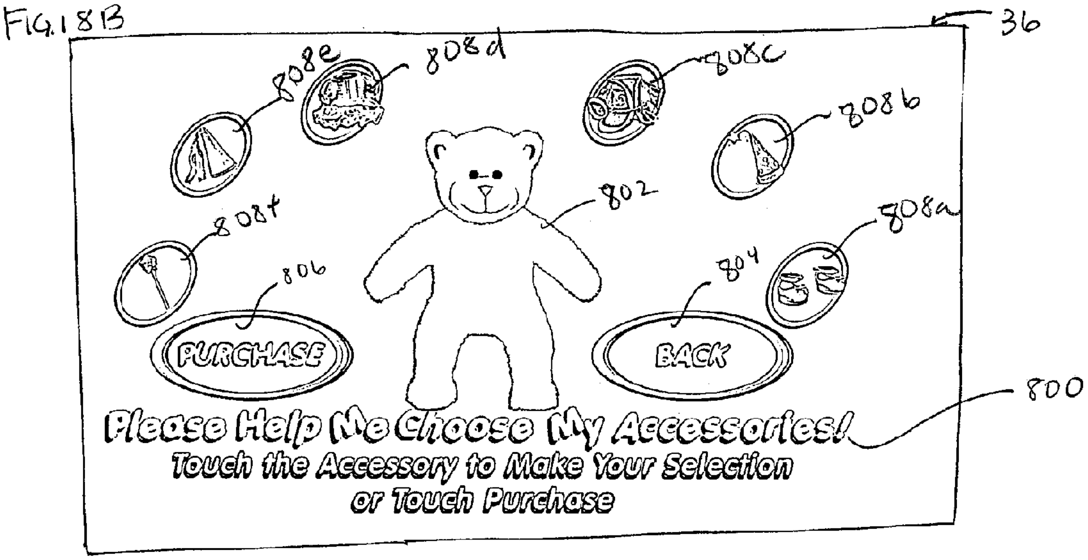

In FIG. 18B, the consumer has selected the bear toy, and the vending machine 20 causes the combination display device touch screen 36 to display a plurality of images of accessory products 808*a* to 808*f* around the image of the bear 802. The displayed accessory products 808*a* to 808*f* include articles of clothing (e.g., a dress 808*d*, a robe 808*c*, a hat 808*b*), shoes 808*a*, or other items that may coordinate with the bear (e.g., a wand 808*f*). The vending machine 20 prompts the consumer to select one of the plurality of accessory products 808*a* to 808*f* by touching one of the corresponding images, as indicated by the displayed message 800. It should be appreciated that selecting the accessory does not cause the vending machine 20 to immediately vend the product or products selected by the consumer. Rather, after the consumer selects the accessory, the vending machine 20 displays the selected accessory interacting with the primary bear toy. In this manner, the consumer has the chance to see the products interacting and to view what the final product will look like before the consumer finalizes his or her decision to purchase the product (s).

In certain embodiments, the vending machine 20 may be configured to provide recommendations to the consumer regarding: (i) which of the available accessories coordinate best with the selected primary product (e.g., bear toy); (ii) which of the available accessories are most popular; (iii) which of the available accessories are most likely to be preferred by the consumer based on consumer identifying information; (iv) or any other suitable information to assist or guide the consumer in making product selections.

Figure 18C:
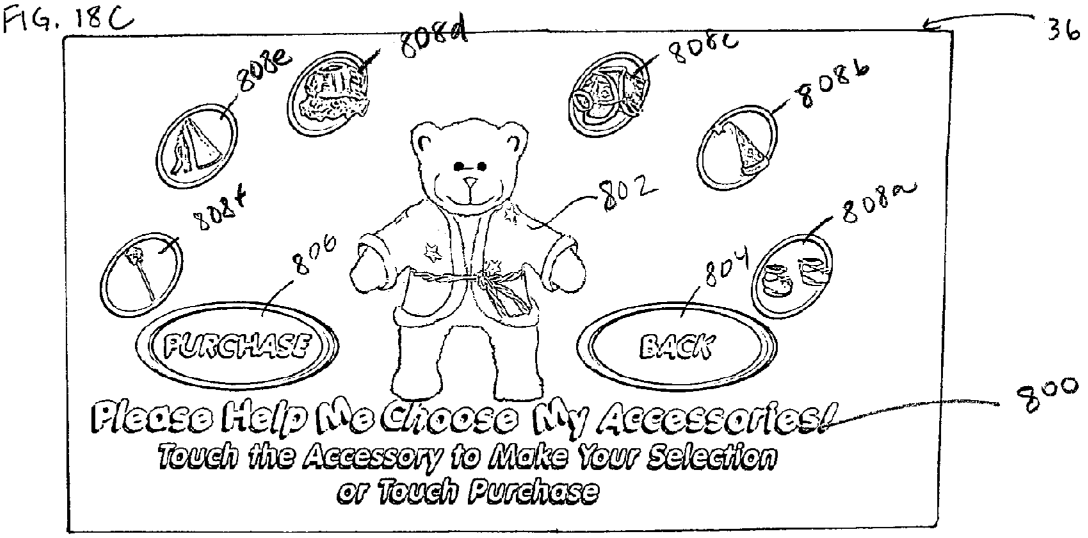

As illustrated in FIG. 18C, the consumer has selected the robe accessory 808*c*. The combination display device touch screen 36 displays the bear 802 wearing the robe 808*c*. The consumer can either press the Purchase button 806 to finalize his or her choices and purchase the bear with the robe accessory, or the consumer can press the Back button 804 to go back and try a new accessory and/or choose additional accessories. Although not shown, in this example, the consumer chooses to go back and try on additional accessories. More particularly, the consumer selects the wizard's hat accessory 808*b*. The consumer chooses to purchase the bear 802, the robe accessory 808*c*, and the wizard's hat accessory 808*b*. Once the consumer's selections are final selections, the vending machine 20 enables the user to make a payment to purchase the finally selected products and product accessories. After receiving the payment from the consumer, the vending machine causes the purchased products and product accessories to be dropped into the product delivery bin 62 of the vending machine 20.

Figure 18D:
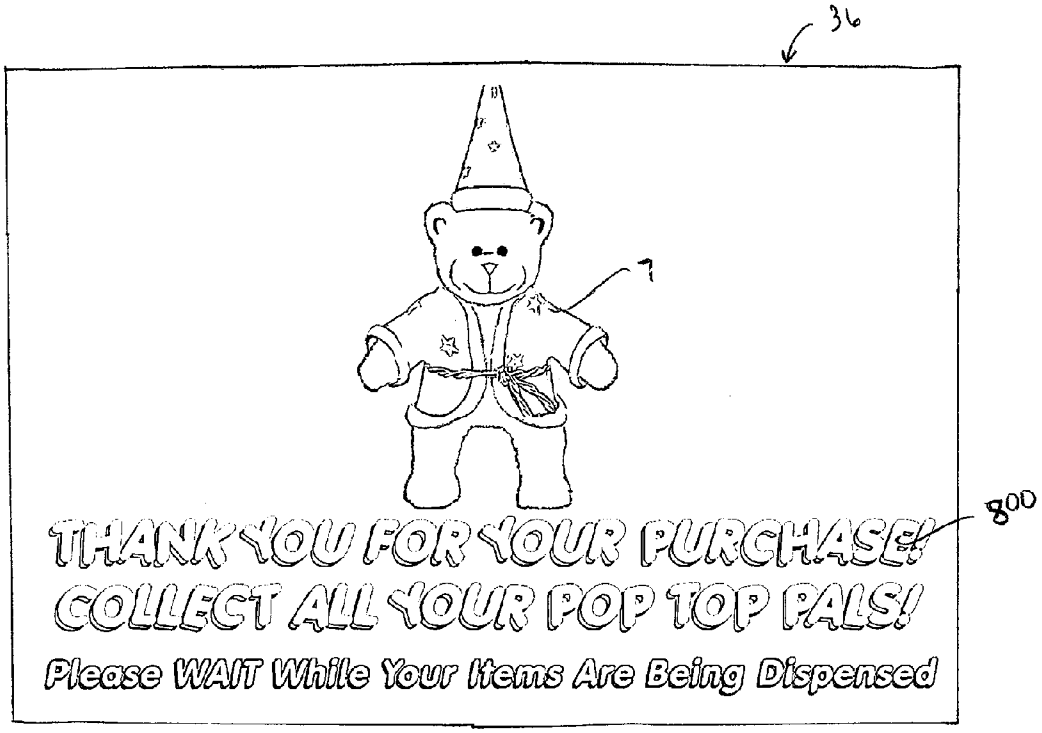

In FIG. 18D, the combination display device touch screen 36 displays a message 800 thanking the consumer for shopping and reminding the consumer to wait for all purchased product to be dispensed. The combination display device touch screen 36 displays an image of the bear 802 wearing the robe 808*c* and the wizard's hat 808*b*. As illustrated by this example embodiment, through simplified, touch screen controls displayed through animated video prompts, the vending machine 20 guides the consumer or purchaser through a series of steps in order to review, select, de-select, customize, accessorize finally purchase any selected primary and secondary products interacted with using the touch screen 36.

In one embodiment, the vending machine may be adapted to provide access to information, such as maps, brochures, advertising and promotional materials in addition to product sales. In one embodiment, the vending machine enables automated account access by users for data entry and payment entry. In one such embodiment, the vending machine enables consumers to pay bills for utilities and other services, such as gas, electric and telephone bills. In another embodiment, the vending machine may be adapted for use in concert with various banking organizations for the redemption of instant rewards programs for points earned by consumers on their credit cards for various products and services.

In one embodiment, the vending machine may be configured for the access of personal premium incentive awards. In one such embodiment, the personal premium incentive awards include credit card reward points. These points may be accessed by the consumer through the vending machine in direct communication with the host banking institution where the points are held. The consumer may redeem any accumulated points for various products stored in the inventory of the vending machine. After the consumer redeems points for one or more products, an appropriate number of rewards points is deducted from the consumer's account for the product purchased. In one embodiment, if a consumer does not have a balance of points sufficient to cover the number of points required to purchase a particular product, the vending machine enables the consumer to pay the difference between the price of the product and the consumer's balance of points in currency directly into the vending machine.

In various alternative embodiments, the vending machine includes any suitable combination of the above described features.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A vending machine comprising:

a housing defining a product holding area;

a frame positioned in the product holding area;

a plurality first product holders, each first product holder removably attached to the frame, each first product holder configured to hold a first product package, each said first product package including an RFID tag holding pocket;

a plurality second product holders positioned behind the plurality of first product holders, said second product holders being different than said first product holders, each second product holder configured to hold a second product package, each said second product package including an RFID tag holding pocket;

a plurality of RFID sensors, each RFID sensor attached to a different one of the first product holders and the second product holders, each first product holder having one of the RFID sensors attached to said first product holder, each second product holder having one of the RFID sensors attached to said second product holder;

a door attached to the housing, said door including a support structure;

a first electronic combination display device and input device supported by the support structure;

a second electronic display device supported by the support structure and configured in one mode to display advertising or other content;

a payment receiver supported by the support structure;

a product retrieval area defined by the support structure;

a lock element mounted to the support structure; and a computer control system configured to control various functions of the vending machine, said computer control system configured to:

(a) receive data from a vending machine operator computer system;

(b) transfer data to the vending machine operator computer system; and (c) receive data from the plurality of RFID sensors to determine first product packages held by the first product holders and to determine second product packages held by the second product holders.

2. The vending machine of claim 1, wherein the first product packages are claimshell packages and each of the first product holders are configured to hold said clamshell packages.

3. The vending machine of claim 2, wherein the second product packages are cylindrical packages and each of the second product holders are configured to hold said cylindrical packages.

4. The vending machine of claim 1, wherein the second product packages are cylindrical packages and each of the second product holders are configured to hold said cylindrical packages.

5. The vending machine of claim 1, wherein the second product holders extend above and below the first product holders.

6. The vending machine of claim 1, wherein each of the first product holders includes a bracket, a drive unit connected to the bracket, a cover plate connected to the bracket, a vending spindle connected to the drive unit, a sensor holder configured to hold one of the RFID sensors, a product guide bar, and an attachment assembly configured to secure said first product holder to the frame.

7. The vending machine of claim 1, wherein each second product holder includes a caged frame, a discharge unit connected to the caged frame, and a sensor holder.

8. The vending machine of claim 7, wherein the caged frame of each second product holder includes a top section that extends downwardly and toward a rear wall of the housing and is configured to receive the second product packages, a central section configured to hold the second product packages, and a bottom section which extends downwardly and toward the door to dispense the second product packages.

9. The vending machine of claim 7, wherein each discharge unit includes a casing which encloses a wheel assembly having a plurality of arms which define multiple compartments which are each configured to hold one of the second product packages.

10. The vending machine of claim 1, wherein the first electronic combination display device and input device includes a touch screen.

11. The vending machine of claim 1, which includes a printer interface supported by the support structure and controlled by the computer control system.

12. The vending machine of claim 1, which includes an illuminated physical product display area supported by the support structure and configured to display certain sample products.

13. The vending machine of claim 1, which includes an Illuminatable signage display area supported by the support structure.

14. The vending machine of claim 1, wherein the computer control system is also configured to determine opening and closing of the door.

* * * * *